United States Patent
Iwamura et al.

(10) Patent No.: US 6,186,629 B1
(45) Date of Patent: *Feb. 13, 2001

(54) OPTICAL DEVICE AND DISPLAY APPARATUS

(75) Inventors: Atsushi Iwamura, Tokyo; Tatsuru Kanamori, Saitama; Toru Kawai, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/216,547

(22) Filed: Dec. 18, 1998

(30) Foreign Application Priority Data

Dec. 22, 1997 (JP) .................................................. 9-353109
Dec. 26, 1997 (JP) .................................................. 9-360612

(51) Int. Cl.[7] .................................................. G03B 21/00
(52) U.S. Cl. .................................. 353/31; 353/34; 353/37
(58) Field of Search ......................................... 353/30, 31

(56) References Cited

U.S. PATENT DOCUMENTS 5,626,409 * 5/1997 Nakayama et al. ..................... 353/31
5,951,136 * 9/1999 Furuhata et al. ........................ 353/31

* cited by examiner

*Primary Examiner*—Safet Metjahic
*Assistant Examiner*—Etienne LeRoux
(74) *Attorney, Agent, or Firm*—Frommer Lawrence & Haug, LLP.; William S. Frommer

(57) ABSTRACT

An illumination optical device has the following elements. A first optical block includes a first lens array having a plurality of cell lenses each being approximately similar in shape to a light modulation device. A second optical block includes a second lens array having a plurality of cell lenses corresponding to the respective cell lenses of the first lens array of the first optical block and each being approximately similar in shape to the light modulation device, and a first converging component for converging beams that have passed through the second lens array toward the light modulation device. A second converging component is disposed in the vicinity of the light modulation device and serves to image beams that are output from the second optical block at a predetermined position. The cell lenses of the first lens array have different aspherical surfaces.

21 Claims, 30 Drawing Sheets

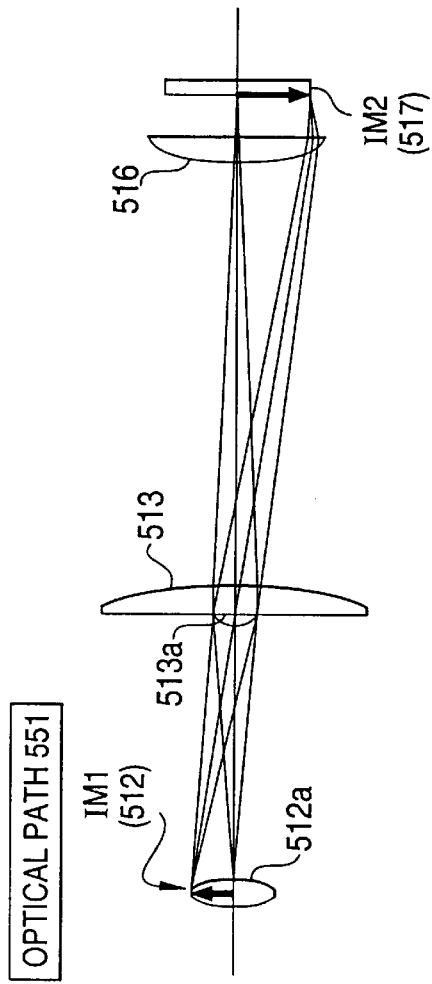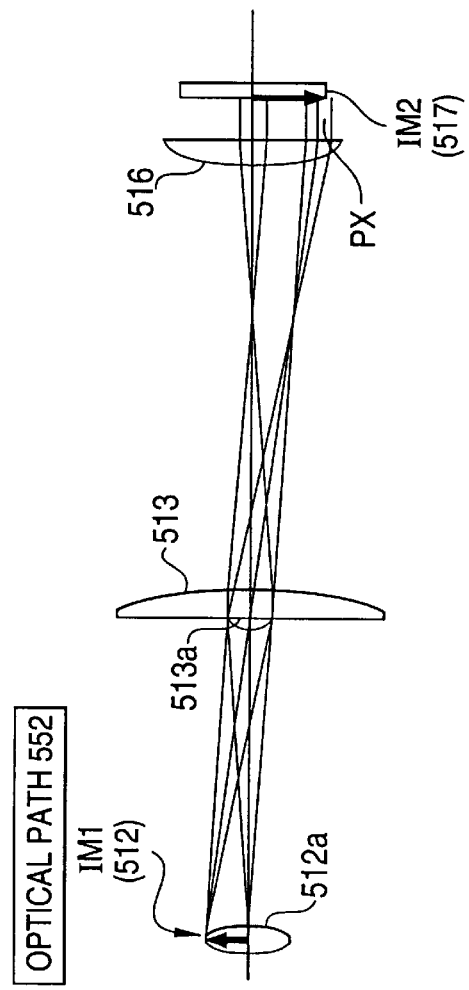

OPTICAL DEVICE AND DISPLAY APPARATUS

BACKGROUND OF THE INVENTION

1. Field of the Invention

The present invention relates to an optical device that can efficiently apply light to a light modulation device (display device) such as a liquid crystal display panel and can be miniaturized, as well as to a display apparatus having such an optical device.

2. Description of the Related Art

Recently, display apparatuses such as a projector apparatus, a television receiver, and a computer display that use an optical device such as a liquid crystal display panel that is a light modulation device called a light bulb have spread in a variety of fields.

In such display apparatuses using a liquid crystal display panel or the like, a light beam that is emitted from a light source having ametal halide lamp, a halogen lamp, or the like is separated into beams of the three primary colors, which are input to a liquid crystal display panel having color filters (R, G, and B) that are provided for the respective colors to improve the color purity. The three beams are modulated by the liquid crystal display panel in accordance with an input video signal and then combined with each other to generate color video signal light, which is projected onto a screen via a projection lens in an enlarged manner.

In the above type of optical system, it is required that a light beam that is emitted from the light source be applied to the liquid crystal display panel efficiently and uniformly. However, the light-emitting surface of the light source has some surface area and hence it is difficult to use the light source as an ideal point light source; a light beam emitted from a real light source has a large divergence angle. Therefore, it is difficult to apply efficiently a light beam emitted from the light source to the liquid crystal display panel.

One generally known method of efficiently applying a light beam that is emitted from a light source and has a large divergence angle to a liquid crystal display panel is such that a light beam to be input to the liquid crystal display panel is converged and uniformized in illuminance profile by using, for example, a lens array in which a number of small lenses are arranged in matrix form.

A general example using such a lens array will be described below with reference to FIG. 1. In a light source 510, a metal halide lamp 510a, for example, is disposed at the focal position of a paraboloid mirror, whereby a light beam that is approximately parallel with the optical axis of the paraboloid mirror is output from its opening. Unnecessary components in the infrared (IR) range and the ultraviolet (UV) range of the light beam output from the light source 510 are interrupted by a UV/IR-cutting filter 511 and only the effective light beam is introduced to a downstream first optical block 501.

The first optical block 501 is constituted of optical elements including a first lens array 512 in which a plurality of convex cell lenses 512a each having an outer shape that is approximately similar (equal in aspect ratio) to the effective apertures of liquid crystal display panels 517, 521, and 527 as light modulation devices (light spatial modulation devices) are arranged in matrix form.

A second lens array 513 of a second optical block 502 that is disposed downstream of the first optical block 501 is formed with a plurality of convex cell lenses 513a on the incidence side and with a single convex surface 513b as a first converging component on the exit side.

Dichroic mirrors 514 and 519 for separating a light beam that has been emitted from the light source 510 into beams of red, green, and blue are disposed between the second lens array 513 and the effective apertures of the liquid crystal display panels 517, 521, and 527.

In the example of FIG. 1, a red beam R is reflected and a green beam G and a blue beam B are transmitted by the dichroic mirror 514. The red beam R reflected by the dichroic mirror 514 is bent in traveling direction by 90° by a mirror 515, converged by a condenser lens 516, and finally input to the red liquid crystal display panel 517.

On the other hand, the green beam G and the blue beam B that have passed through the dichroic mirror 514 are separated from each other by a dichroic mirror 519. That is, the green beam G is reflected and bent in traveling direction by 90° by the dichroic mirror 519 and then introduced to the green liquid crystal display panel 521 via a condenser lens 520. The blue beamB passes through the dichroic mirror 519 (goes straight) and is then introduced to the blue liquid crystal display panel 527 via relay lenses 522 and 524, a condenser lens 526, and mirrors 523 and 525.

A polarizing plate (not shown) for polarizing incident light in a predetermined direction is disposed on the incidence side of each of the liquid crystal display panels 517, 521, and 527 and a polarizing plate (not shown) that transmits only a component having a prescribed polarization plane of exit light is disposed downstream of each of the liquid crystal display panels 517, 521, and 527 so that the light intensity is modulated in accordance with the voltage of a liquid crystal driving circuit.

The beams of the respective colors that have been modulated by the liquid crystal display panels 517, 521, and 527 are combined with each other by a dichroic prism 518 as a light composing means. In the dichroic prism 518, the red beam R and the blue beam B are reflected by respective reflection surfaces 518a and 518b so as to be directed to a projection lens 530. The green beam G passes through the reflection surfaces 518a and 518b. As a result, the R, G, and B beams are combined together so as to travel along the same optical axis, and are then projected onto a screen (not shown) by the projection lens 530 in an enlarged manner.

Next, the optical system including the respective lens arrays 512 and 513 of the first optical block 501 and the second optical block 502 will be described in more detail with reference to FIGS. 2, 3, and 4A–4B.

FIG. 2 shows an example of how beams are formed mainly by the optical characteristic of the first optical block 501. A god light beam L emitted from the light source is divided by the cell lenses 512a of the first lens array 512 and, after exiting from the first optical block 501, forms images corresponding to the respective cell lenses 512a of the first lens array 512 in the vicinity of the second optical block 502.

Then, the beams are introduced to the condenser lens 520 as a second converging component by the first converging component 513b.

At this time, image points of cells in a peripheral portion of the first lens array 512 become large-angle-of-view object points of the condenser lens 520 as the second converging component. In this manner, images formed in the vicinity of the second optical block 502 by the respective cell lenses 512a of the first lens array 512 are re-imaged in the vicinity of an entrance pupil E of the projection lens 530 by the condenser lens 520 as the second converging component.

FIG. 3 shows an example of how a light beams are formed mainly by the second optical block 502. A divergence angle θ of a beam that can be captured from the above-described illumination system can be controlled by properly setting the external dimensions of each cell lens 513a of the second lens array 513 and the interval between the first lens array 512 and the second lens array 513.

Beams thus captured within the divergence angle θ are introduced to the condenser lens 520 as the second converging component by the convex surface 513b as the first converging component, and applied, efficiently and uniformly, to the liquid crystal display panel 521 by a composite converging component that is a combination of the first and second converging components.

However, the above action causes the following problems. A beam that passes through a central portion of the convex surface 513b converges at position P1 that is close to the liquid crystal display panel 521, and a beam that passes through a peripheral portion of the convex surface 513b converges at position P2 that is close to the second lens array 513. That is, the imaging position shifts from the liquid crystal display panel 521 side to the second optical block 502 side as the beam passes through a portion of the convex surface 513b that is closer to its periphery.

A light beam that has been applied to, for example, the liquid crystal display panel 521 in the above manner is modulated by the liquid crystal display panel 521 having the polarizing plates on its upstream and downstream sides, and then input to a color composing element such as a dichroic prism 518.

The beam that enters the condenser lens 520 as the second converging component after passing through the convex surface 513b as the first converging component is a green beam G that has been separated halfway from a red beam R and a blue beam B by the optical elements such as the dichroic mirrors (not shown).

The dichroic prism 518 is formed by bonding together four prisms via reflection surfaces 518 and 518b that are thin films having a prescribed reflection characteristic.

The red light R, the green light G, and the blue light B are modulated by the respective liquid crystal display panels (only the green beam G is indicated by solid lines in FIG. 2) and enter the cross dichroic prism 518 from different directions as indicated by arrows.

While the green beam G that has been modulated by the liquid crystal display panel 521 simply passes through the dichroic prism 518, the red light R and the blue light B are reflected by the respective reflection surfaces 518a and 518b. In this manner, the R, G, and B beams are combined with each other by the cross dichroic prism 518 into color video signal light, which is input to the projection lens 530.

By disposing the lens arrays 512 and 513 having the convex lenses 512a and 513a, respectively, that are arranged in matrix form downstream of the light source in the above-described manner, a light beam emitted from the light source can be applied to the effective aperture of, for example, the liquid crystal panel 521 more efficiently with a higher degree of uniformity than in a case where only a condenser lens is provided.

However, in the above example using the first optical block 501 and the second optical block 502, each of the first lens array 512 and the second lens array 513 has lens cells having exactly the same shape that are arranged in matrix form.

A first problem of the case of using the above-configured lens arrays is as follows. As shown in FIG. 2, the imaging positions and the aberrations of the respective cell lenses 512a of the first lens array 512 are exactly the same. Beams imaged by the respective cell lenses 512a of the first lens array 512 are introduced to the condenser lens 520 as the second converging component by the convex surface 513b as the first converging component. As shown in broken lines and solid lines in FIG. 2, the beams enter the condenser lens 520 at different angles. Therefore, as shown in FIGS. 2 and 4A, since the beams are influenced by the off-axis aberrations of the condenser lens 520, the imaging performance of the beams becomes non-uniform in the vicinity of the entrance pupil E as indicated by regions AR1 and AR2, to cause loss and unevenness in light quantity.

A second problem is as follows. As shown in FIG. 3, the cell lenses 513a of the second lens array 513 act on respective beams in different ranges of a light beam that is imaged in the vicinity of the liquid crystal panel 521 by the converging component that is a combination of the convex surface 513b as the first converging component and the condenser lens 520 as the second converging component. As a result, as shown in FIGS. 3 and 4B, the beams passing through the respective cell lenses 513a of the second lens array 513 are influenced differently by the aberrations of the composite converging component, and their imaging performance in the vicinity of, for example, the liquid crystal display panel 521, to cause loss and unevenness in light quantity.

A light beam emitted from an ordinary light source has two orthogonal polarization planes and polarization components having those polarization planes are generally called a P-polarization component (hereinafter referred to as a P wave) and an S-polarization component (hereinafter referred to as an S wave) In this type of display apparatus, a light beam emitted from the light source is applied to a polarizing means provided upstream of the liquid crystal display panel, to thereby extract only a P wave or an S depending on the type of polarizing plate disposed in front of the liquid crystal display panel.

A polarizing beam splitter (hereinafter abbreviated as PBS) is used as a means for producing only a P or S wave. For example, a light beam having random polarization (P+S waves) is input, at a predetermined angle, to a PBS that is provided in a prism, and a P wave is transmitted while an S wave is reflected. Both of the P and S waves are returned to parallel beams by refracting those by end faces of the prism, and only the S wave, for example, is caused to pass through a (½)λ plate so as to be converted to a P wave. Alternatively, the S wave is refracted by an end face of the prism or reflected by a reflecting means such as a mirror so as to become parallel with the traveling direction of the P wave that has passed through the PBS, and then the S wave is input to a (½)λ plate so as to be converted to a P wave.

The former type of optical block is a symmetrical one-unit device and the latter type of optical block is a symmetrical one-unit or two-unit device.

FIG. 5 shows an example configuration and optical paths of a conventional polarizing means.

A light source 530 is a halogen lamp, a metal halide lamp, or the like. A light beam emitted from the light source 530 is input to an optical block 540, whereby only P waves, for example, are caused to enter a liquid crystal display panel (not shown) The optical block 540 is formed by bonding together a plurality of prisms 540a–540f made of glass, for example. PBSs 542 are provided between the prisms 540b and 540c and between the prisms 540d and 540e. Wave plates 543 are provided in front of the respective prisms 540a and 540f. Optical paths of P+S waves emitted from the light source 530 are indicated by solid arrows, optical paths of P waves separated by the optical block 540 are indicated by blanked arrows, and optical paths of S waves are indicated by hatched arrows.

P waves and S waves emitted from the light source 530 are separated from each other by the PBSs 542. The P waves simply pass through the PBSs 542 and reach the liquid crystal panel side. The S waves are reflected by the PBSs 542, reflected forward by the prisms 540*a* and 540*f*, and then converted by the wave plates 543 to P waves, which enter the liquid crystal display panel. That is, only the P waves are output from the prisms 540*c* and 540*d* and the front surfaces of the wave plates 543.

In this manner, the optical block 540 causes only one of the P wave and S wave that are emitted from the light source 530 to enter the liquid crystal display panel (not shown).

Incidentally, where the optical block 540 is not used, the opening of the light source 530 is similar to the effective area of the liquid crystal display panel and it is difficult to apply light uniformly to also side portions of a liquid crystal display panel for forming a horizontally long image of an aspect ratio 16:9, for example (the illuminance profile does not become uniform).

It is difficult to efficiently illuminate a liquid crystal display panel with a light beam emitted from a lamp light source and having a large divergence angle. In a conventional technique for solving this problem, light reaching a liquid crystal display panel is increased while the illuminance profile is uniformized by using such an optical means as a multi-lens array in which a number of small lenses are arranged.

For example, as shown in FIG. 6, aplurality of convex lenses 544*a* of a multi-lens array 544 are each formed so as to be similar (equal in aspect ratio) to the effective aperture of a liquid crystal display panel as a light modulation device, and are arranged in matrix form. The convex lenses 544*a* of the flat multi-lens array 544 provided on the light source (not shown) side are formed so as to be opposed to respective convex lenses 545*a* of a multi-lens array 545. A light beam emitted from the light source (not shown) is applied to the effective aperture of a liquid crystal display panel.

A light beam emitted from the light source of a liquid crystal projector apparatus enters the multi-lens array 544 and is then focused on the convex lenses 545*a* of the multi-lens array 545 by the respective convex lenses 544*a*. The convex lenses 545*a*, an exit-side convex lens 545*b*, and a condenser lens 546 re-image the images formed by the respective convex lenses 544*a* on a liquid crystal panel 547 so as to be superimposed one on another.

FIG. 6 shows only the optical path of a green beam G by solid lines. A red beam R and a blue beam B are similarly modulated by red and blue liquid crystal display panels (not shown) and applied to a cross dichroic prism 548 from different directions as indicated by arrows.

The red beam R and the blue beam B that have been modulated by the respective liquid crystal display panels are reflected by respective reflection surfaces 548*a* and 548*b* of the dichroic prism (also called a cross prism) 548 toward a projection lens (not shown) side. The green beam G passes through the reflection surfaces 548*a* and 548*b*. Therefore, the R, G, and B beams are combined by the dichroic prism 548 so as to go along the single optical axis and enter the projection lens.

By disposing the multi-lens arrays 544 and 545 having the convex lenses 544*a* and 545*a*, respectively, that are arranged in matrix form downstream of the light source in the above-described manner, a light beam emitted from the light source can be applied to the effective aperture of, for example, the liquid crystal panel 547 more efficiently with a higher degree of uniformity than in a case where only the condenser lens 546 is provided.

If the optical block 540 is disposed in front of the opening of the light source 530 and the multi-lens arrays 544 and 545 are disposed in front of the aperture of the optical block 540 as shown in FIG. 7, a light beam that is output from the light source 530 can be utilized more efficiently than in the cases of FIGS. 5 and 6.

However, since the incidence-side portion of the optical block 540 of FIG. 7 has approximately the same size as the opening of the light source 530, the exit-side portion of the optical block 540 is made larger than the light source 530. Therefore, not only is a large space needed to accommodate the optical block 540 but also the cost increases.

Where only the multi-lens arrays 544 and 545 are provided as shown in FIG. 6, a randomly polarized light beam as emitted from the light source is input to the polarizing plate. Since about 60% of the total light quantity is interrupted, the efficiency of utilization of the light source is not high.

Even where the optical block 540 and the multi-lens arrays 544 and 545 are combined as shown in FIG. 7, the multi-lens arrays 544 and 545 are made as large as the exit-side aperture of the optical block 540, to cause a problem that the optical path length from the multi-lens array 545 to the liquid crystal panel 547 is increased.

Recently, to solve the above problems, for example, an optical device for a display apparatus as shown in FIG. 8 has been proposed. In an optical block used in this optical device, its incidence-side portion and exit-side portion can be formed in approximately the same size as the opening of a light source. Further, the optical block can be made thin. Therefore, this optical device enables space saving and weight reduction.

The optical device of FIG. 8 is composed of a multi-lens array 512 in which a plurality of convex lenses 512*a* each having an external shape that is approximately similar (i.e., equal in aspect ratio) to the effective apertures of liquid crystal display panels 517, 521, and 526 as light spatial modulation devices are arranged in matrix form, an optical block 501 that is constituted of prescribed optical parts, and a multi-lens array 513 that is disposed in front of the optical block 501 and in which a plurality of convex lenses 513*a* are formed.

The optical block 501 is formed by bonding together a plurality of prisms, and beams focused by the multi-lens array 512 are input to predetermined prisms of the optical block 501. The randomly polarized beams (P+S waves) are polarized into P-polarization (or S-polarization) beams by the optical block 501, pass through or are reflected by the multi-lens array 513 and various optical elements such as dichroic mirrors, and are finally input to the liquid crystal display panels 517, 521, and 526 in a state that the beams are separated into R, G, and B beams.

That is, the multi-lens arrays 512 and 513 and the optical block 501 allow a light beam emitted from the light source 506 to be applied to the effective apertures of the respective liquid crystal display panels 517, 521, and 526 efficiently and uniformly.

The multi-lens array 513, which is disposed downstream of the optical block 501, is formed with a plurality of convex lenses 513*a* on the incidence side (the side opposed to the optical block 501) and with a single convex surface as a condenser lens on the exit side (liquid crystal display panel side). Dichroic mirrors 514 and 519 for separating a light beam emitted from the light source 506 into R, G, and B beams are disposed between the multi-lens array 513 and the effective apertures of the liquid crystal display panels 517, 521, and 526.

The optical block 501 will be described below with reference to FIGS. 9 and 10. FIG. 9 is a perspective view, as viewed from the front side, showing an appearance of the optical block 501, and FIG. 10 is a top plan view showing part of the optical block 501 in an enlarged manner.

For example, the optical block 501 is formed by bonding together triangular prisms 502*a* and 502*b* and parallelogrammic prisms 503*a* and 503*b*. Randomly polarized beams (P+S waves) that have been emitted from the light source 506 and passed through the multi-lens array 512 are input to the optical block 501 from a direction indicated by a solid arrow, and only P waves, for example, are output from the respective prisms 503*a* and 503*b* as indicated by blanked arrows.

The exit-side slope surface of each prism 503*a* is provided with a PBS 504 that, for example, reflects an S wave and transmits a P wave. A P wave that has passed through the PBS 504 is output forward from the front surface of the prism 503*b* or 502*b*.

The slope surface of each prism 503*a* opposed to the PBS 504 is provided with a mirror 505 that reflects forward an S wave that has been reflected by the PBS 504. A (½)λ plate 506 indicated by hatching is provided on the front surface of each prism 503*a* to convert an S wave that has been reflected by the PBS 504 to a P wave and output it forward.

That is, the prisms 503*a* serve as incidence portions of the optical block 501, and beams that have entered the prisms 503*a* are polarized by the PBSs 504 and output forward from the prisms 502*b*, 503*a*, and 503*b*. The prisms 503*a* are provided in a number corresponding to the number of convex lenses 512*a* of the multi-lens array 512 or convex lenses 513*a* of the multi-lens array 513.

The optical block 501 that is composed of the prisms, PBSs 504, mirrors 505, etc. makes it possible to convert input randomly polarized beams (P+S waves) to P waves and output the P waves. Further, the incidence-side area of the optical block 501 is made equal to its exit-side area. In addition, since the optical block 501 can be made thinner than conventional ones, the space for accommodating the optical block 501 can be saved.

In the optical means shown in FIG. 6 using only the multi-lens arrays, because of their principle of operation, it is appropriate from the viewpoint of light utilization efficiency to set the focal length of the convex lenses 544*a* and 545*a* of the multilens arrays 544 and 545 approximately equal to the air-converted distance between the multi-lens arrays 544 and 545.

However, in the optical device for a display apparatus shown in FIG. 8 in which the multi-lens arrays 512 and 513 and the optical block 501 are combined, beams output from the multi-lens arrays 512 pass through the optical block 501 before reaching the multi-lens array 513. Therefore, as shown in FIG. 10, there is a difference in air-converted distance between an optical path 551 of beams that reach the multi-lens array 513 after passing through the PBSs 504 and an optical path 552 of beams that reach the multi-lens array 513 after being reflected by the PBSs 504 and the mirrors 505 and passing through the (½)λ plates 506.

FIGS. 11A and 11B compare the optical paths 551 and 552 having such a difference with regard to the imaging relationship between the multi-lens array 512 and the liquid crystal panel 517.

In FIGS. 11A and 11B, with an assumption that a convex lens 512*a* of the multi-lens array 512 is an image point IM1, the image point IM1 is re-imaged on the liquid crystal display panel 517 as an image point IM2 by the multi-lens array 513 and the condenser lens 516.

All the lenses of the conventional multi-lens array 513 have the same focal length that is equal to the air-converted distance of the optical path 551. Therefore, in the case of the optical path 552, because of the difference in air-converted distance from the optical path 551 that occurs in the optical block 501, an image on the liquid crystal display panel 517 is in a defocused state PX. This is a factor of decreasing the quantity of light that passes through the liquid crystal display panel 517 and in turn lowering the light utilization efficiency of the light source.

SUMMARY OF THE INVENTION

An object of the present invention is to provide a display apparatus having an optical device that can provide uniform imaging performance by preventing loss and unevenness in light quantity, as well as to provide an optical device that can apply light efficiently to a display device such as a liquid crystal display panel and enables miniaturization and a display apparatus having such an optical device.

The invention provides a display apparatus comprising a light source; an illumination optical device; a light modulation device to which a light beam emitted from the light source is applied via the illumination optical device; and a projection lens for projecting a modulated light beam, the illumination optical device comprising a first optical block including a first lens array having a plurality of cell lenses each being approximately similar in shape to the light modulation device, the cell lenses having different aspherical surfaces; a second optical block including a second lens array having a plurality of cell lenses corresponding to the respective cell lenses of the first lens array of the first optical block, and a first converging component for converging beams that have passed through the second lens array toward the light modulation device; and a second converging component disposed in the vicinity of the light modulation device, for imaging beams that are output from the second optical block at predetermined positions.

In the invention, a light beam emitted from the light source is applied to the light modulation device of the display apparatus via the illumination optical device. The projection lens of the display apparatus projects a modulated light beam.

The first optical block of the illumination optical device includes the first lens array having a plurality of cell lenses.

The second optical block includes a second lens array having a plurality of cell lenses corresponding to the respective cell lenses of the first lens array of the first optical block. The first converging component of the second optical block converges beams that have passed through the second lens array toward the light modulation device.

The second converging component is disposed in the vicinity of the light modulation device and serves to image beams that are output from the second optical block at a predetermined position, for example, at a position of a pupil of the projection lens.

The cell lenses of the first lens array of the first optical block have different aspherical surfaces.

Since the cell lenses of the first lens array have different aspherical surfaces rather than the same spherical surface, beams that have passed through the first and second lens arrays and the first and second converging components are imaged uniformly, for example, in the vicinity of the pupil of the projection lens. As a result, loss and unevenness in light quantity in the projection lens can be prevented.

According to a second aspect of the invention, there is provided a display apparatus comprising a light source; an illumination optical device; a light modulation device to which a light beam emitted from the light source is applied via the illumination optical device; and a projection lens for projecting a modulated light beam, the illumination optical device comprising a first optical block including a first lens array having a plurality of cell lenses each being approximately similar in shape to the light modulation device; a second optical block including a second lens array having a plurality of cell lenses corresponding to the respective cell lenses of the first lens array of the first optical block, and a first converging component for converging beams that have passed through the second lens array toward the light modulation device, the cell lenses having different aspherical surfaces; and a second converging component disposed in the vicinity of the light modulation device, for imaging beams that are output from the second optical block at a predetermined position.

In this aspect of the invention, a light beam emitted from the light source is applied to the light modulation device of the display apparatus via the illumination optical device. The projection lens of the display apparatus projects a modulated light beam.

The first optical block of the illumination optical device includes the first lens array having a plurality of cell lenses each being approximately similar in shape to the light modulation device.

The second optical block includes a second lens array having a plurality of cell lenses corresponding to the respective cell lenses of the first lens array of the first optical block. The first converging component of the second optical block converges beams that have passed through the second lens array toward the light modulation device.

The second converging component is disposed in the vicinity of the light modulation device and serves to image beams that are output from the second optical block at a predetermined position.

The cell lenses of the second lens array of the second optical block have different aspherical surfaces.

Since the cell lenses of the second lens array of the second optical block have different aspherical surfaces rather than the same spherical surface, beams that have passed through the first and second lens arrays and the first and second converging components are imaged properly and uniformly on the light modulation device.

In the invention, by making each set of the cell lenses of the first lens array of the first optical block and the cell lenses of the second lens array of the second optical block have different aspherical surfaces, both of the above-described uniformly imaging functions can be obtained.

According to a third aspect of the invention, there is provided an optical device comprising an optical block comprising a polarization component transmission/reflection member for transmitting a first polarization component of light and reflecting a second polarization component of light; a polarization component reflection member for reflecting the second polarization component that has been reflected by the polarization component transmission/reflection member; a polarization component conversion member for converting the second polarization component that has been reflected by the polarization component reflection member into a first component; a plurality of first prisms for causing the polarization component conversion member to output the first polarization component; and a plurality of second prisms disposed adjacent to the respective first prisms, for outputting the first polarization component that has been transmitted by the polarization component transmission/reflection member of the first prisms; a first lens array disposed on a light incidence side of the optical block and being a collection of a plurality of lenses; and a second lens array disposed on a light exit side of the optical block and being a collection of a plurality of lenses, part of the lenses of the second lens array that correspond to the first prisms having a different focal length than part of the lenses of the second lens array that correspond to the second prisms.

According to a fourth aspect of the invention, there is provided an optical device comprising an optical block comprising a polarization component transmission/reflection member for transmitting a first polarization component of light and reflecting a second polarization component of light; a polarization component reflection member for reflecting the second polarization component that has been reflected by the polarization component transmission/reflection member; a polarization component conversion member for converting the second polarization component that has been reflected by the polarization component reflection member into a first component; a plurality of first prisms for causing the polarization component conversion member to output the first polarization component; and a plurality of second prisms disposed adjacent to the respective first prisms, for outputting the first polarization component that has been transmitted by the polarization component transmission/reflection member; a first lens array disposed on a light incidence side of the optical block and being a collection of a plurality of lenses; and a second lens array disposed on a light exit side of the optical block and being a collection of a plurality of lenses, part of the lenses of the second lens array that correspond to the first prisms having a different focal length than part of the lenses of the second lens array that correspond to the second prisms.

In the third and fourth aspects of the invention, part of the lenses of the second lens array that correspond to the first prisms have a different focal length than part of the lenses of the second lens array that correspond to the second prisms.

Therefore, the degree of the defocusing phenomenon of illumination light that is applied to an illumination object of the optical device, for example, a light modulation means such as a liquid crystal display panel can be reduced, whereby the light utilization efficiency in the illumination object can be increased.

According to a fifth aspect of the invention, there is provided a display apparatus comprising a light source; an optical device; a light modulation device to which a light beam emitted from the light source is applied via the optical device; and a projection lens for projecting a light beam modulated by the light modulation device, the illumination optical device comprising: an optical block comprising a polarization component transmission/reflection member for transmitting a first polarization component of the light beam emitted from the light source and reflecting a second polarization component of the light beam emitted from the light source; a polarization component reflection member for reflecting the second polarization component that has been reflected by the polarization component transmission/reflection member; a polarization component conversion member for converting the second polarization component that has been reflected by the polarization component reflection member into a first component; a plurality of first prisms for causing the polarization component conversion member to output the first polarization component; and a plurality of second prisms disposed adjacent to the respective first prisms, for outputting the first polarization component that has been transmitted by the polarization component transmission/reflection member of the first prisms; a first lens array disposed on a light incidence side of the optical block and being a collection of a plurality of lenses; and a second lens array disposed on a light exit side of the optical block and being a collection of a plurality of lenses, part of the lenses of the second lens array that correspond to the first prisms having a different focal length than part of the lenses of the second lens array that correspond to the second prisms.

In this display apparatus, the degree of the defocusing phenomenon of illumination light that is applied to an illumination object of the optical device, for example, a light modulation means such as a liquid crystal display panel can be reduced, whereby the light utilization efficiency in the illumination object can be increased.

BRIEF DESCRIPTION OF THE DRAWINGS

FIGS. 11A and 11B show how image point defocusing occurs on a liquid crystal display panel in a conventional example in which two lens arrays are used;

DETAILED DESCRIPTION OF THE PREFERRED EMBODIMENTS

Preferred embodiments of the present invention will be hereinafter described with reference to the accompanying drawings.

The following embodiments include various technically preferable limitations because they are specific, preferred examples of the invention. The scope of the invention is not limited to those embodiments unless a specific statement to the effect that the invention is limited to a certain feature is made in the following description.

Figure 1:
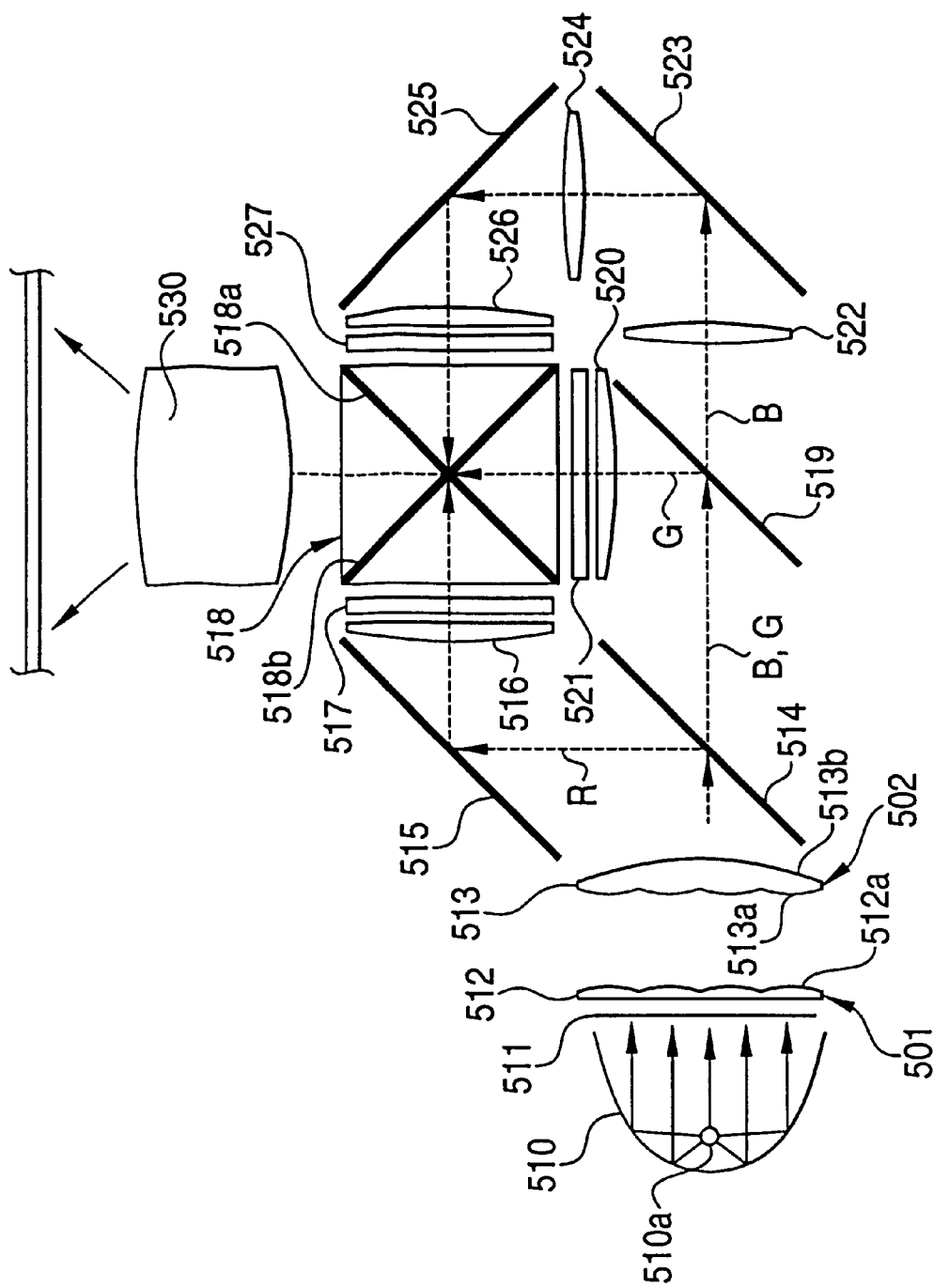
FIG. 1 shows an example of optical system of a conventional projector.
Figure 2:
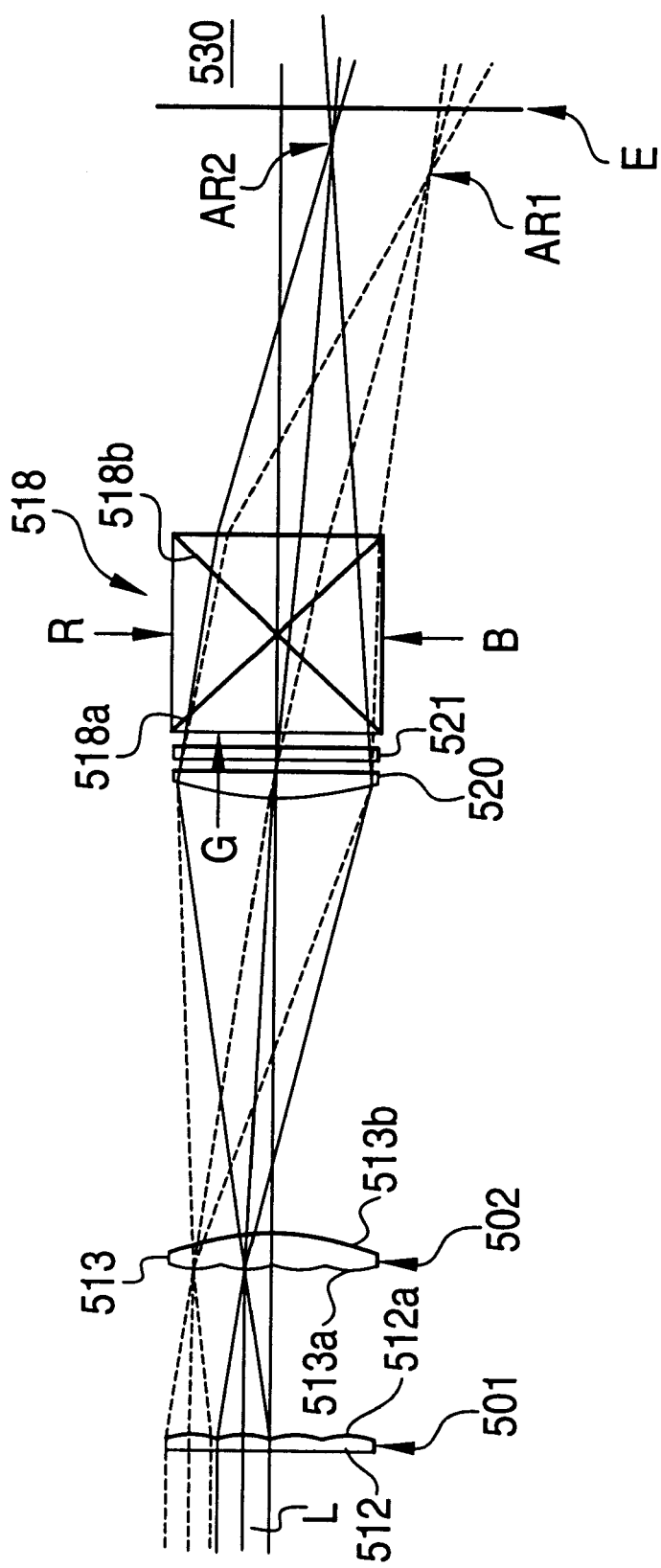
FIGS. 2, 3 and 4A—4B illustrate problems of the conventional optical system of FIG. 1.
Figure 3:
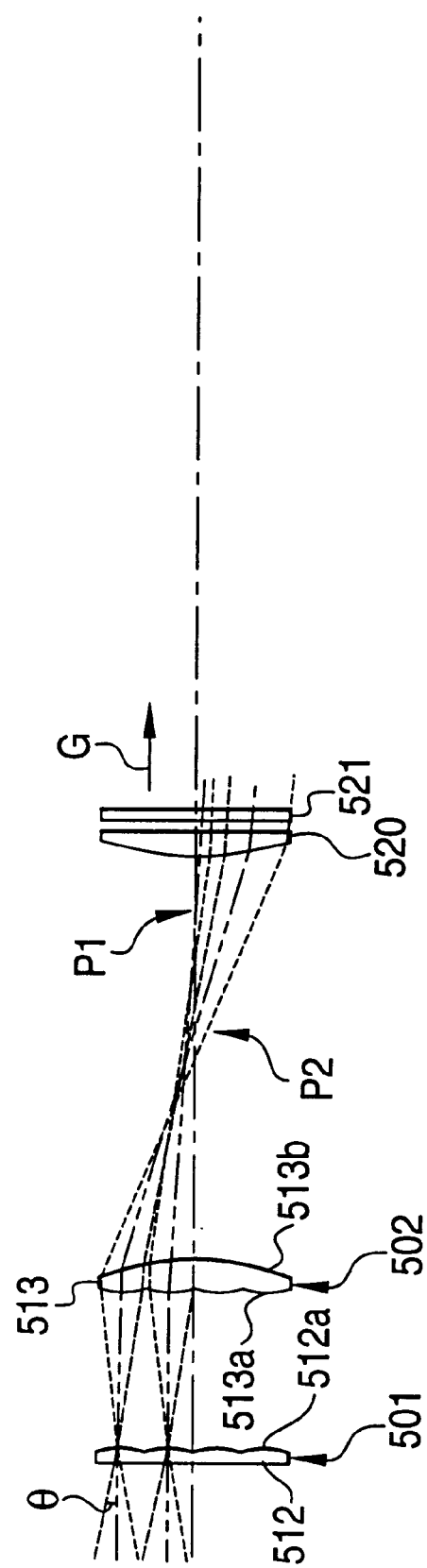
Figure 4A:
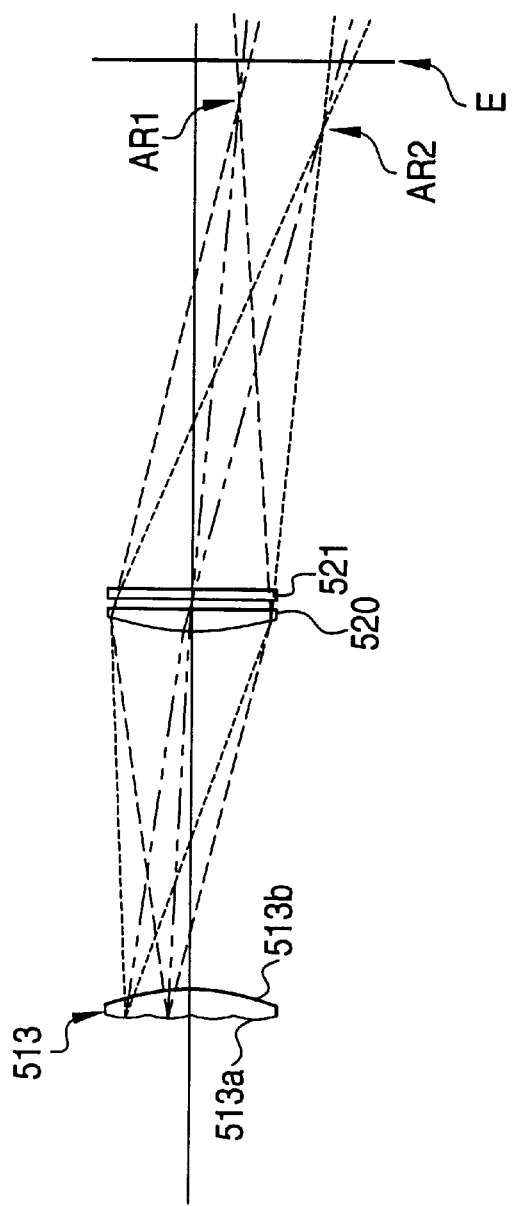
Figure 4B:
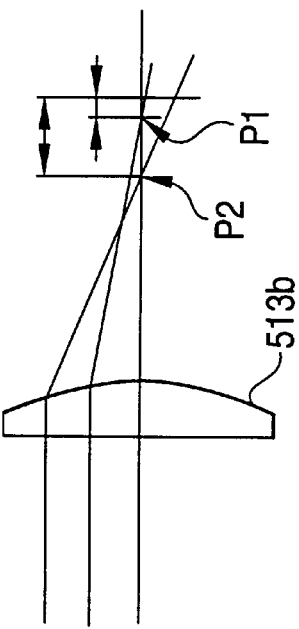
Figure 5:
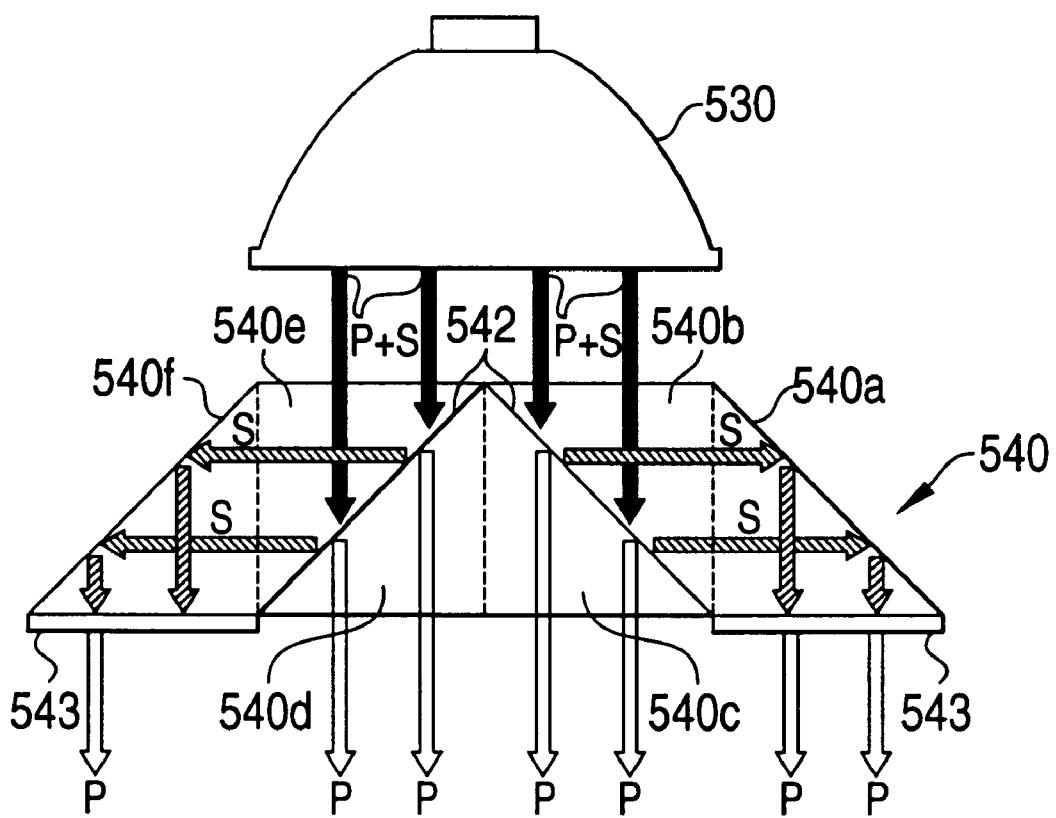
FIG. 5 shows a conventional light source and polarization conversion element.
Figure 6:
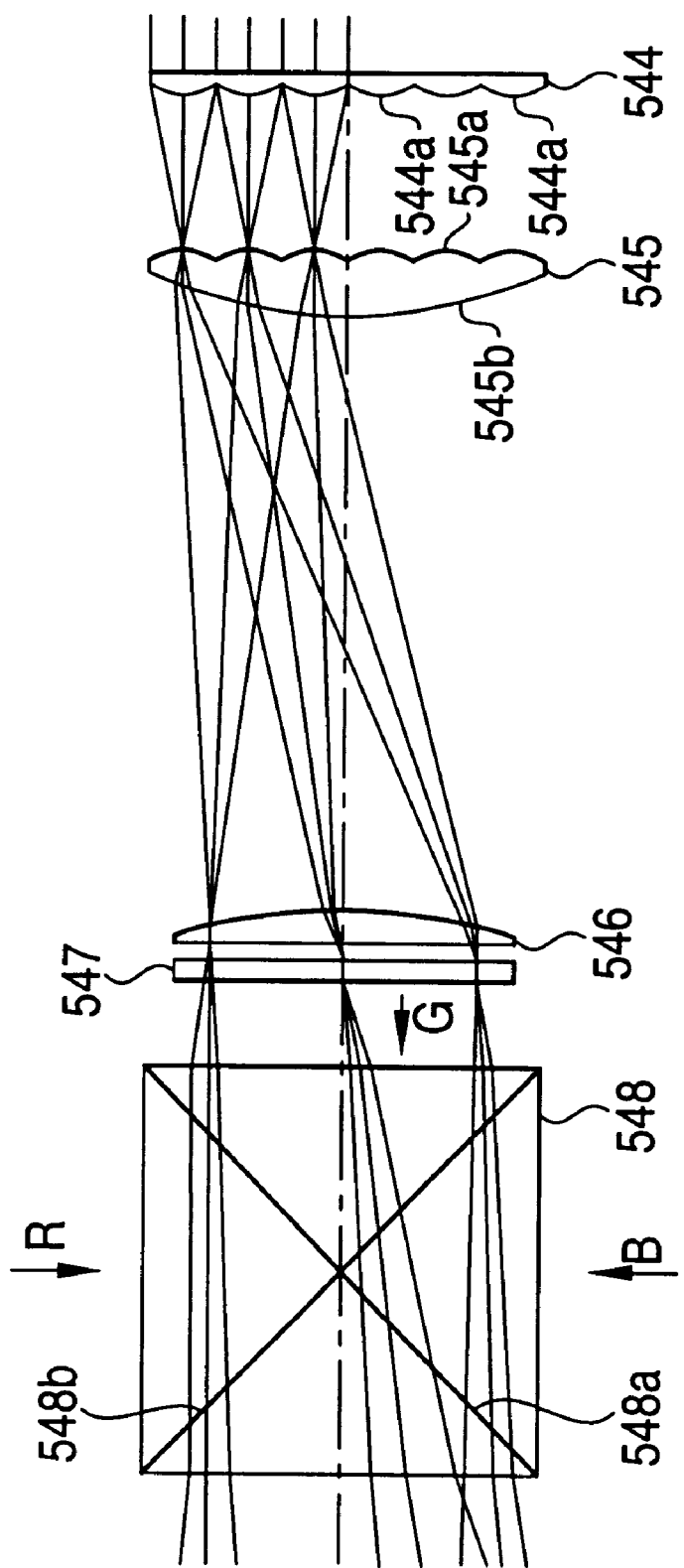
FIG. 6 shows an example of a conventional optical device that is not provided with the conventional polarization conversion element.
Figure 7:
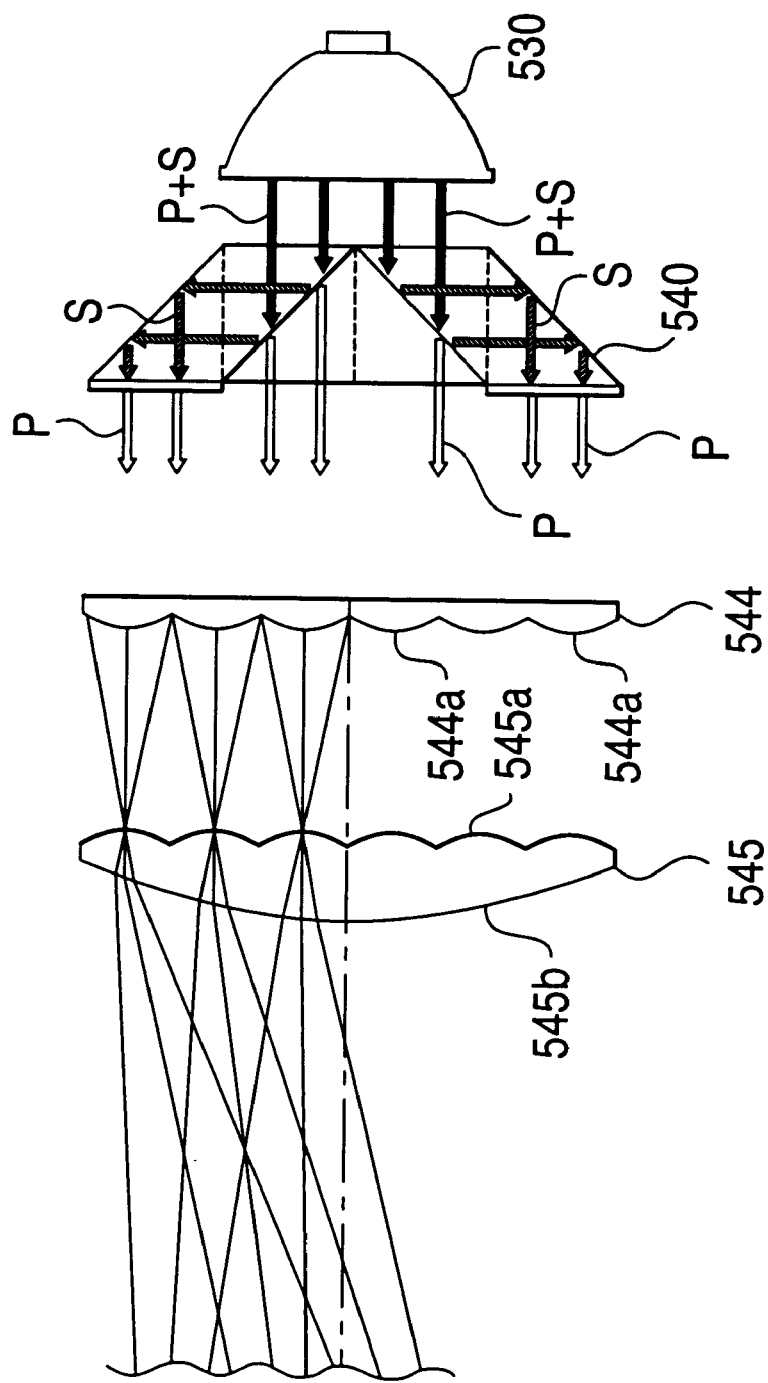
FIG. 7 shows an example of an optical device that is provided with the conventional polarization conversion element.
Figure 8:
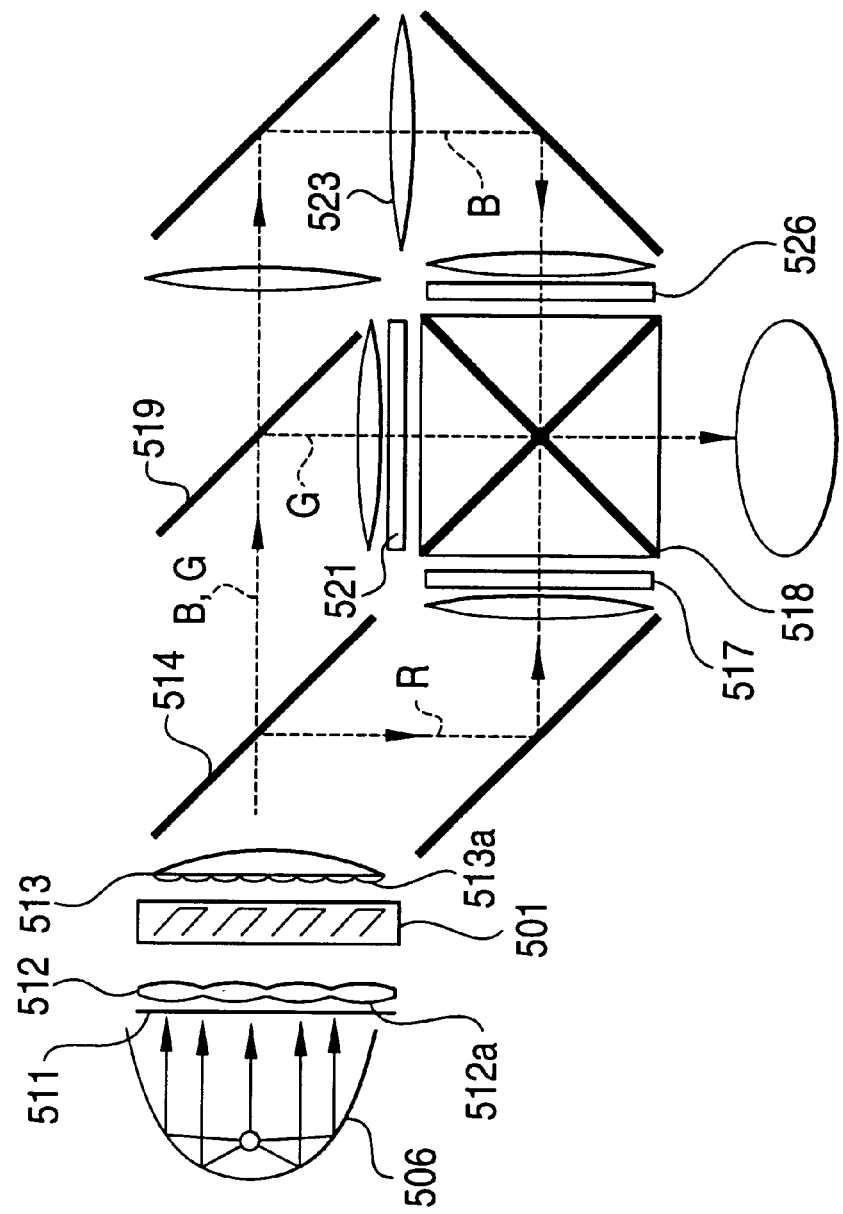
FIG. 8 shows a display apparatus having a conventional polarization conversion element.
Figure 9:
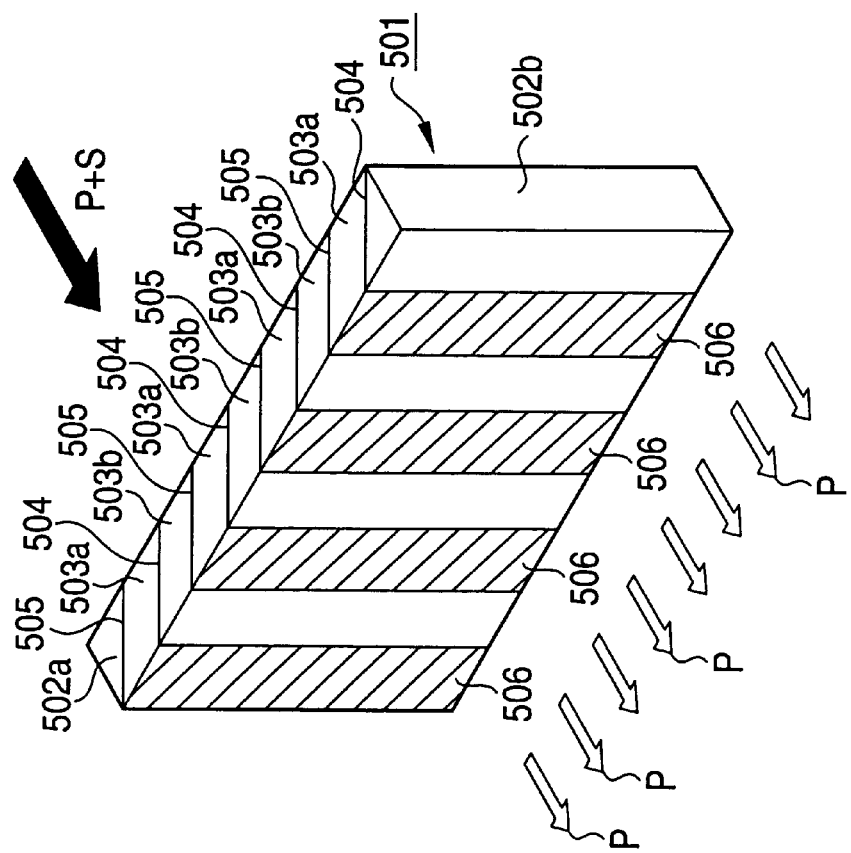
FIG. 9 is a perspective view of the polarization conversion element shown in FIG. 8.
Figure 10:
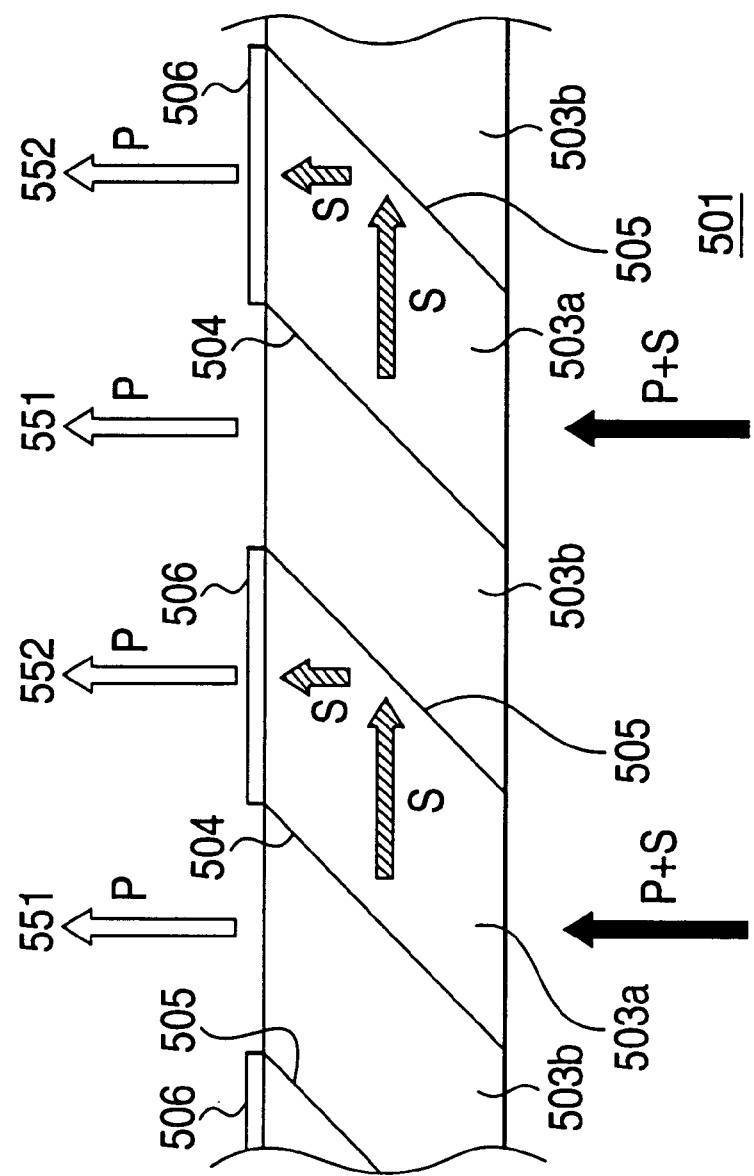
FIG. 10 is a plan view of part of the polarization conversion element shown in FIG. 8.
Figure 12:
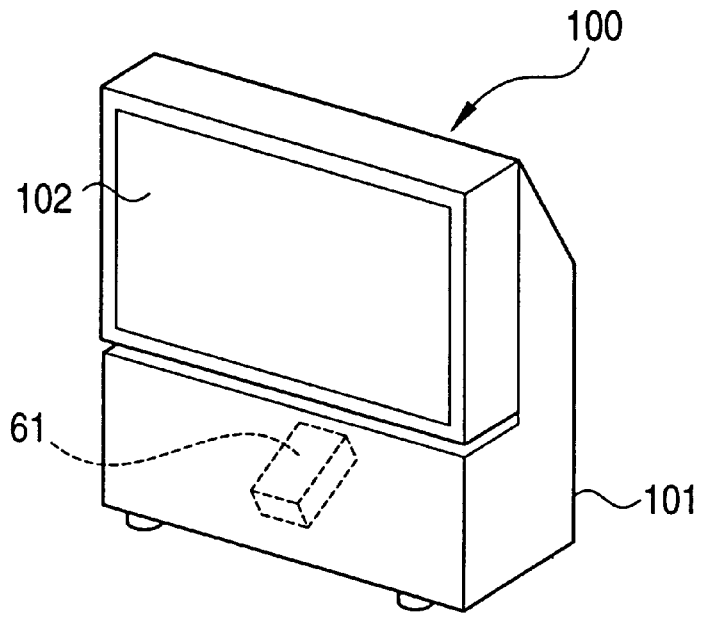
FIG. 12 is a perspective view showing a display apparatus according to an embodiment of the invention.
Figure 13:
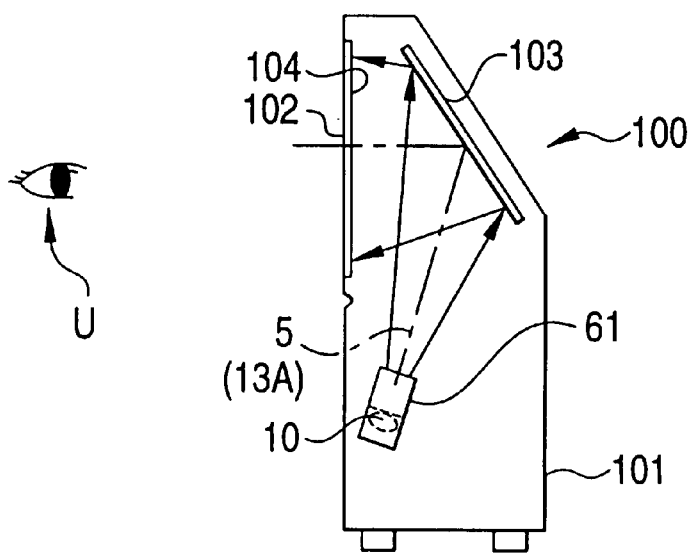
FIG. 13 is a side view showing an internal structure of the display apparatus of FIG. 12.

FIG. 12 is a perspective view showing an appearance of a liquid crystal rear projection television set (also called a liquid crystal projector apparatus) 100 that is provided with a projection display apparatus 61 having an optical device according to a preferred embodiment of the invention. FIG. 13 is a side view of the television set 100 and shows its internal structure.

As for a general configuration of the television set 100, as shown in FIGS. 12 and 13, the television set 100 has a cabinet 101, a screen 102, a mirror 103, and the projection display apparatus 61. Projection light 5 that originates from a light source 10 and is output from the projection display apparatus 61 is reflected by the mirror 103 and projected onto the screen 102 from its back side.

An image projected on the screen 102 can be viewed by a user U in the form of a color or black-and-white image formed on the screen 102.

In the following description of the embodiment, it is assumed that a color image can be displayed on the screen 102.

Figure 14:
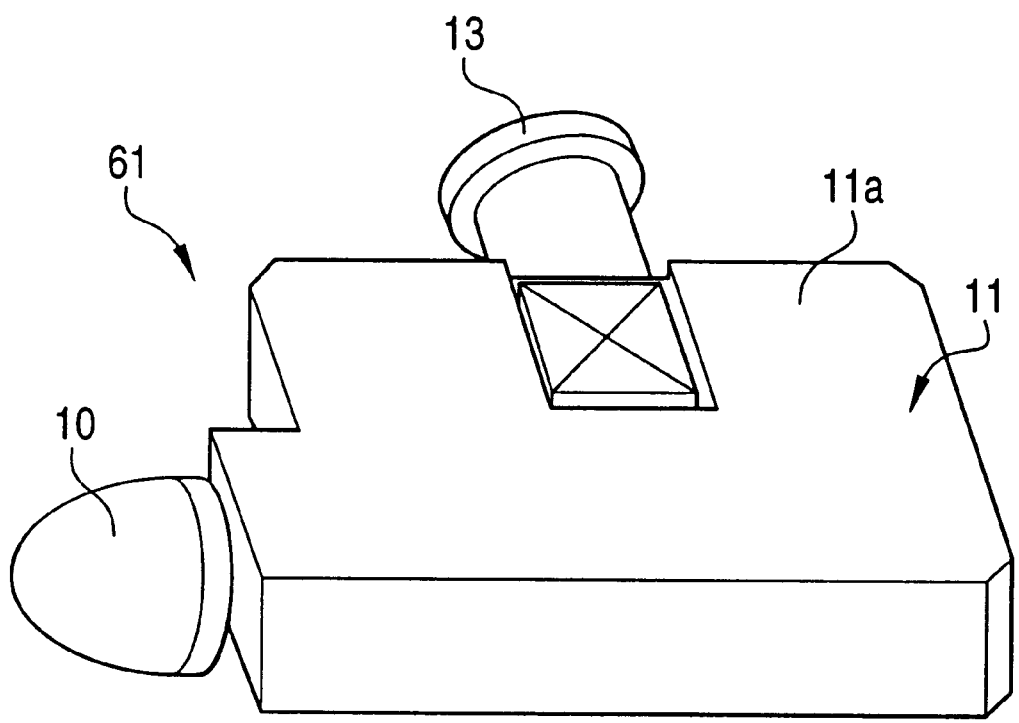
FIG. 14 shows a projection display apparatus provided in the display apparatus of FIGS. 12 and 13.
Figure 15:
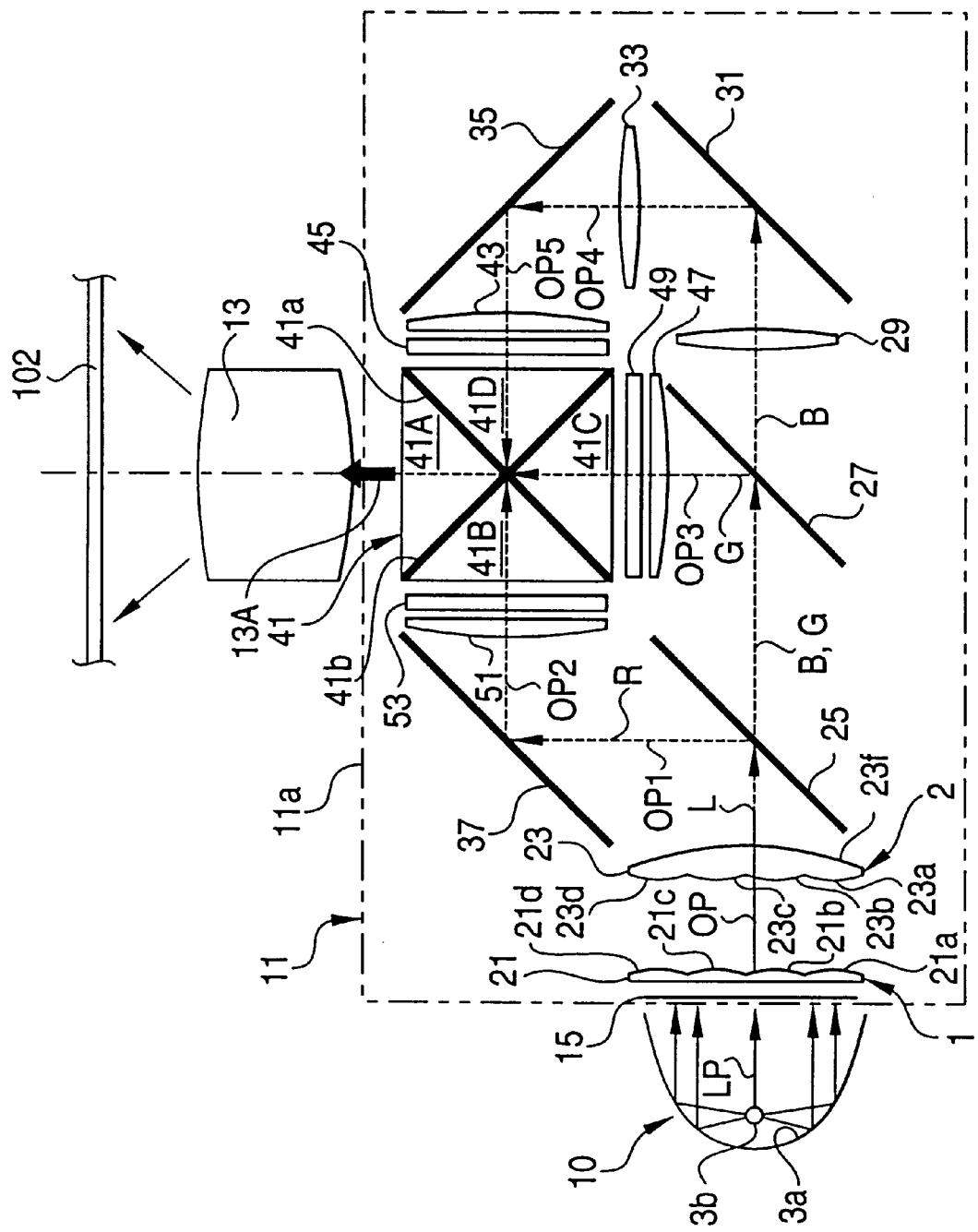
FIG. 15 shows the structure of an optical device used in the projection display apparatus of FIG. 14.

As shown in FIGS. 14 and 15, the projection display apparatus 61 has an optical device 11, a light source 10, and a projection lens 13. The light source 10 and the projection lens 13 are attached to a main body 11a of the optical device 11 in a detachable manner.

As shown in FIG. 15, the light source 10 has a lamp 3b and a reflector 3a having, for example, a paraboloidal surface. The lamp 3b may be a metal halide lamp, a halogen lamp, or the like. The projection lens 13 has a mechanism capable of performing a focus adjustment on composed light (color image light) 13A coming from the optical device 11 so that it is focused on the back surface 104 of the screen 102 (see FIG. 13).

Next, the optical system in the optical device 11 will be described with reference to FIG. 15.

A filter 15, a first optical block 1, and a second optical block 2 are disposed in the vicinity of the light source 10 so as to be parallel with each other and perpendicular to the optical axis OP of a light beam LP that is output from the light source 10.

The first optical block 1 and the second optical block 2, each of which is configured in such a manner that a number of lenses each having, for example, a rectangular shape are collected in a plane, uniformize a light beam LP coming past the filter 15 and supplies resulting illumination light to liquid crystal display panels 45, 49, and 53. Beams output from the liquid crystal display panels 45, 49, and 53 are combined and supplied to the projection lens 13.

A light beam that has passed through the filter 15, the first optical block 1, and the second optical block 2 includes a red beam R, a green beam G, and a blue beam B. The optical system described below operates to separate the light beam L into a red beam R, a green beam G, and a blue beam B, subjecting those beams of the three primary colors to prescribed modulation, and recombines those beams, whereby composed light (color image light) 13A is supplied to the projection lens 13.

Dichroic mirrors 25 and 27, a relay lens 29, and a mirror 31 are arranged along the optical axis OP. A mirror 37 is disposed on an optical axis OP1 that is perpendicular to the optical axis OP so as to correspond to the dichroic mirror 25. The mirror 37, a condenser lens (second converging component) 51, and a liquid crystal display panel 53 as a light modulation member are disposed along an optical axis OP2 that is parallel with the optical axis OP.

A condenser lens (second converging component) 47, and a liquid crystal display panel 49 as a light modulating member are disposed along an optical axis OP3 that is parallel with the optical axis OP1 so as to correspond to the dichroic mirror 27.

A relay lens 33 and a mirror 35 are disposed along an optical axis OP4 that is parallel with the optical axes OP1 and OP3 so as to correspond to the mirror 31. A condenser lens (second converging component) 43 and a liquid crystal display panel 45 as a light modulation member are disposed along an optical axis OP5 that passes through the mirror 35 and coincides with the optical axis OP2.

A dichroic prism (also called a light composing member, a composing optical element, or a cross prism) 41 is disposed so as to be opposed to the liquid crystal display panels 53, 49, and 45. The projection lens 13 is disposed so as to be opposed to the dichroic prism 41.

Each of the dichroic mirrors 25 and 27 is a mirror having a characteristic of reflecting or transmitting light depending on the wavelength.

As shown in FIG. 15, are beam R of a light beam L is reflected by the dichroic mirror 25 toward the mirror 37 while a green beam G and a blue beam B pass through the dichroic mirror 25 and reach the dichroic mirror 27. The green beam G is reflected by the dichroic mirror 27 toward the condenser lens 47 and the liquid crystal display panel 49. The blue beam B passes through the dichroic mirror 27 and the relay lens 29, is reflected by the mirror 31, passes through the relay lens 33, and finally passes through the condenser lens 43 and the liquid crystal display panel 45.

The red beam R is reflected by the mirror 37 and passes through the condenser lens 51 and the liquid crystal display panel 53.

The dichroic prism 41 will be described below with reference to FIG. 15. The dichroic prism 41 is a prism for combining a red beam R, a green beam G, and a blue beam B into composed light 13A, and is formed by bonding together four prisms 41A–41D having a triangular cross-section with an adhesive. One or two surfaces of each of the prisms 41A–41D are formed with an optical thin film (optical multilayered film) 41a and 41b having a predetermined light transmission/reflection characteristic. That is, the optical thin films 41a and 41b are formed on the bonding surfaces of the prisms 41A–41D.

Each of the prisms 41A–41D of the dichroic prism 41 is made of plastics or glass and is so shaped as to have a triangular cross-section.

A brief description will be made below of the path of a light beam LP from its generation by the lamp 3b of the light source 10 to its arrival at the screen 102.

In passing through the filter 15, unnecessary components (infrared and ultraviolet components) are removed from the light beam LP generated by the lamp 3b, whereby a light beam L is output from the filter 15. A red beam R of the light beam L is reflected by the dichroic mirror 25 and the mirror 37, passes through the condenser lens 51 and the liquid crystal display panel 53, and is reflected by the optical thin film 41a of the dichroic prism 41.

On the other hand, a green beam G and a blue beam B of the light beam L pass through the dichroic mirror 25. Thereafter, the green beam G is reflected by the dichroic mirror 27, passes through the condenser lens 47 and the liquid crystal display panel 49, and then passes through the optical films 41a and 41b of the dichroic prism 41.

The blue beam B that has passed through the dichroic mirror 27 passes through the relay lens 29, is reflected by the mirror 31, passes through the relay lens 33, and is then reflected by the mirror 35. Thereafter, the blue beam B passes through the condenser lens 43 and the liquid crystal display panel 45 and is then reflected by the optical thin film 41b of the dichroic prism 41.

As described above, the red beam R, the green beam G, and the blue beam B that have entered the dichroic prism 41 are combined with each other by the light transmission/reflection characteristic of the optical thin films 41a and 41b into composed light 13A which contains information of images displayed by the respective liquid crystal panels 53, 49, and 45. The composed light 13A is projected, in an enlarged manner, onto the back surface of the projection screen 102 by the projection lens 13.

Next, the first optical block 1 and the second optical block 2 will be described with reference to FIGS. 15–21.

Figure 16:
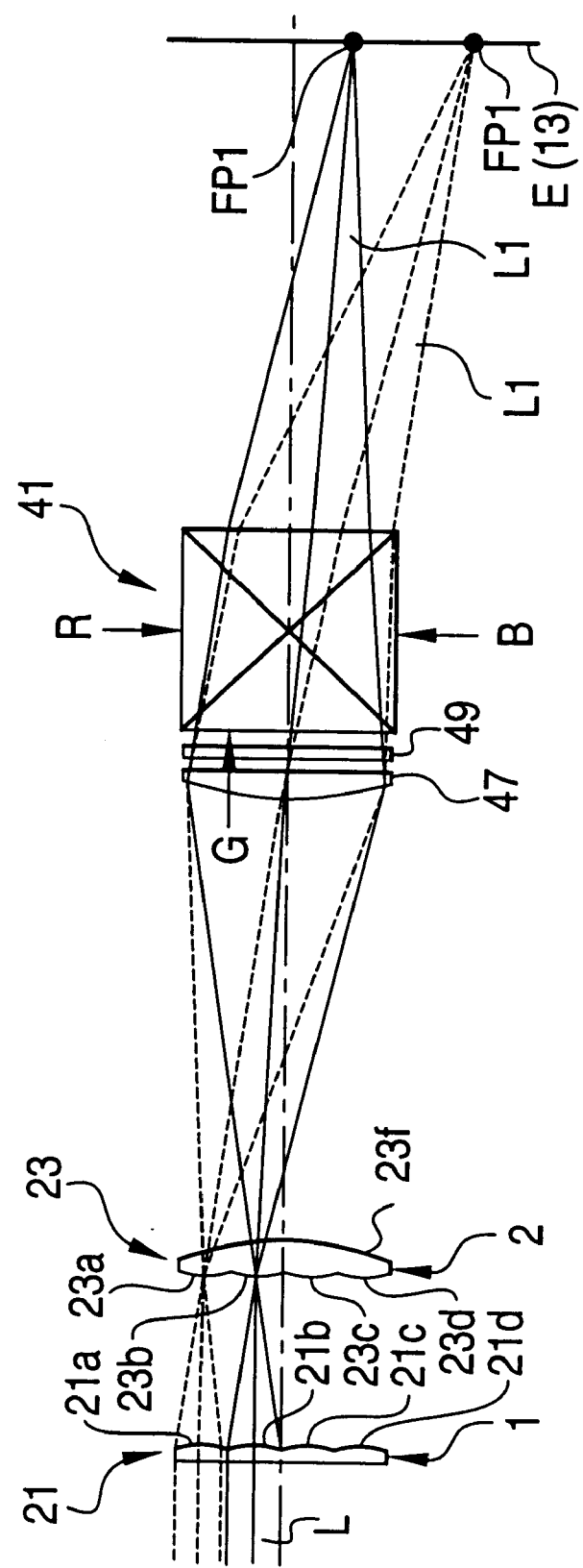
FIG. 16 shows first and second optical blocks and other optical elements and shows how images are formed mainly by the first optical block.
Figure 17:
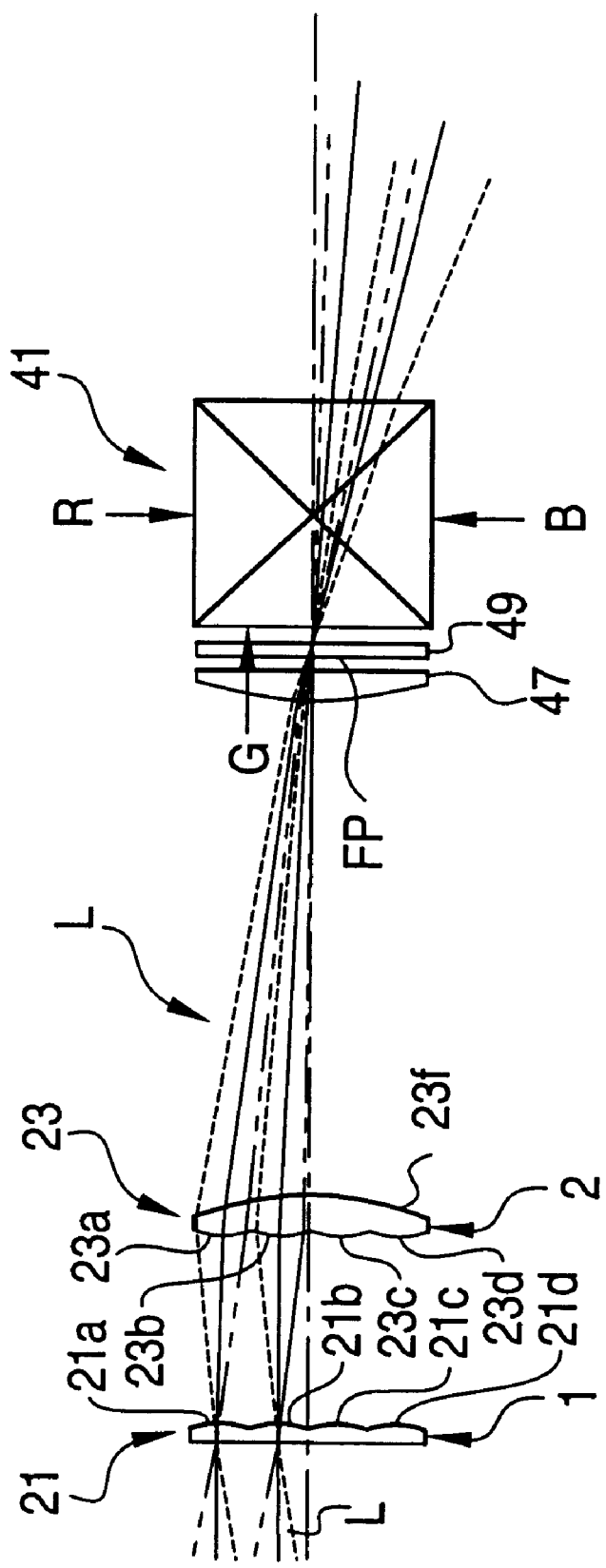
FIG. 17 s show images are formed on a liquid crystal display panel mainly by the second optical block.

First, reference is made to FIGS. 15–17. The first optical block 1 and the second optical block 2 are spaced from each other and disposed perpendicularly to the optical axis OP. The first optical block 1 and the second optical block 2 are disposed parallel with the filter 15 and located between the filter 15 and the dichroic mirror 25.

A light beam LP generated by the lamp 3b of the light source 10 (see FIG. 15) enters the filter 15 and the first optical block 1 in the form of an approximately parallel light beam. The light beam LP passes through the first optical block 1 and the second optical block 2 and a resulting light beam L reaches the dichroic mirror 25.

Figure 18A:
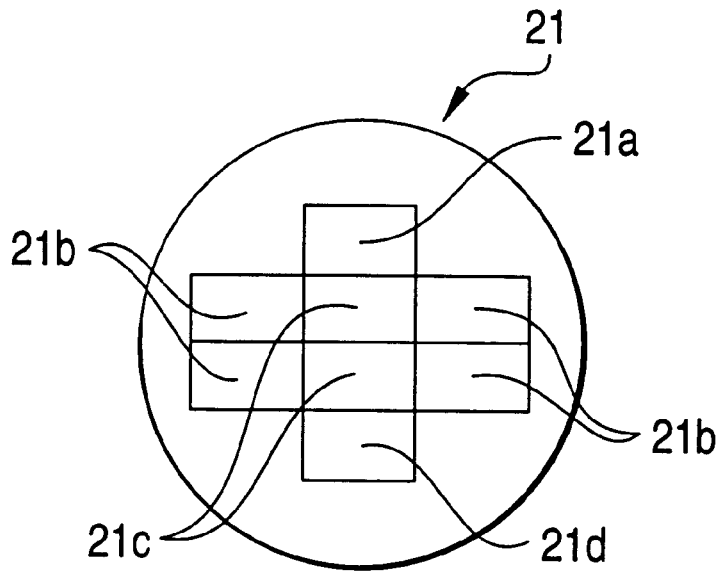
FIGS. 18A and 18B show example arrangements of cell lenses of the first optical block and cell lenses of the second optical block, respectively.
Figure 20A:
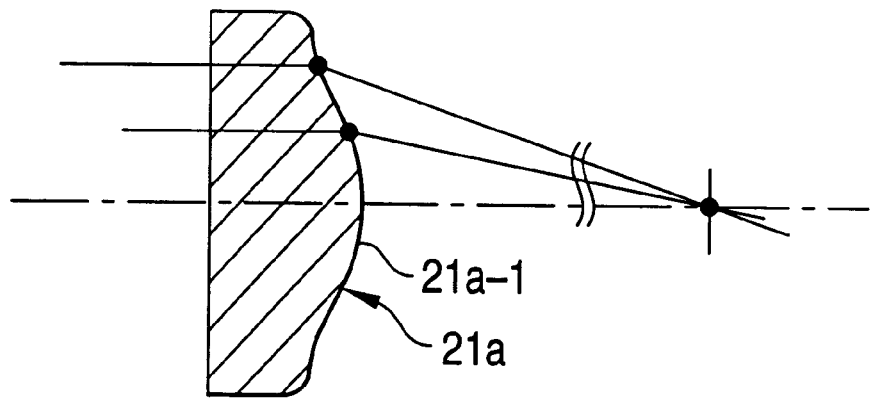
FIGS. 20A and 20B are sectional views showing shapes of a cell lens of the first optical block and a cell lens of the second optical block, respectively.

As shown in FIGS. 15–17, the first optical block 1 has a first lens array 21. As shown in FIG. 18A, the first lens array 21 has cell lenses 21a–21d that are arranged in matrix form. As shown in FIG. 20A, each of the cell lenses 21a–21d is composed of at least two kinds of aspherical surfaces. For example, the cell lenses 21a and 21d have a different aspherical surface shape than the cell lenses 21b and 21c. Alternatively, all the cell lenses 21a–21d may have different aspherical surface shapes depending on their positions.

Figure 18B:
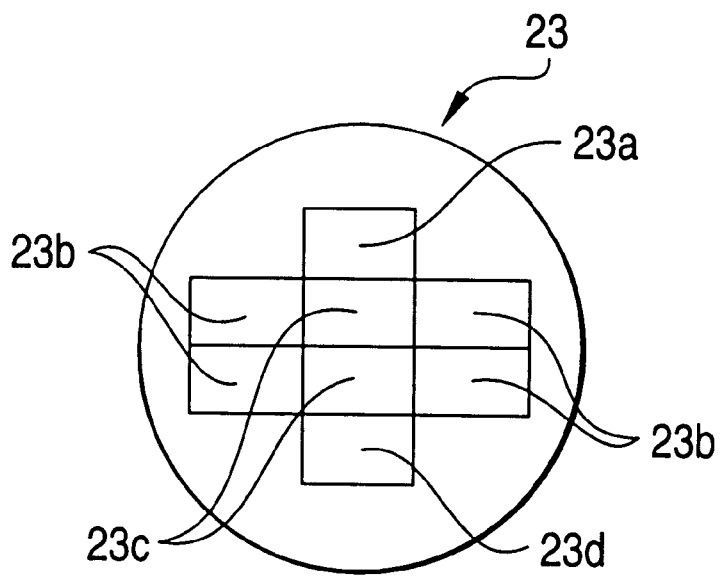
Figure 20B:
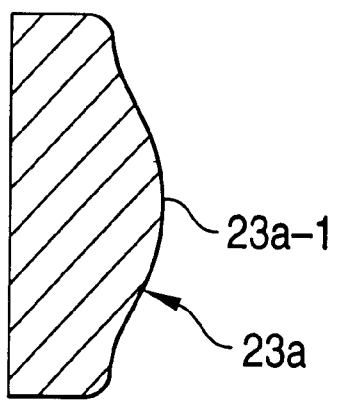

On the other hand, as shown in FIGS. 15–17, the second optical block 2 has a second lens array 23. As shown in FIG. 18B, the second lens array 23 has a plurality of cell lenses 23a–23d. The cell lenses 23a–23d are located at positions corresponding to the respective cell lenses 21a–21d of the first lens array 21 shown in FIG. 18A. As shown in FIG. 20B, each of the cell lenses 23a–23d is composed of at least two kinds of aspherical surfaces. For example, the cell lenses 23a and 23d have a different aspherical surface shape than the cell lenses 23b and 23c. Alternatively, all the cell lenses 23a–23d may have different aspherical surface shapes depending of their positions.

Figure 19:
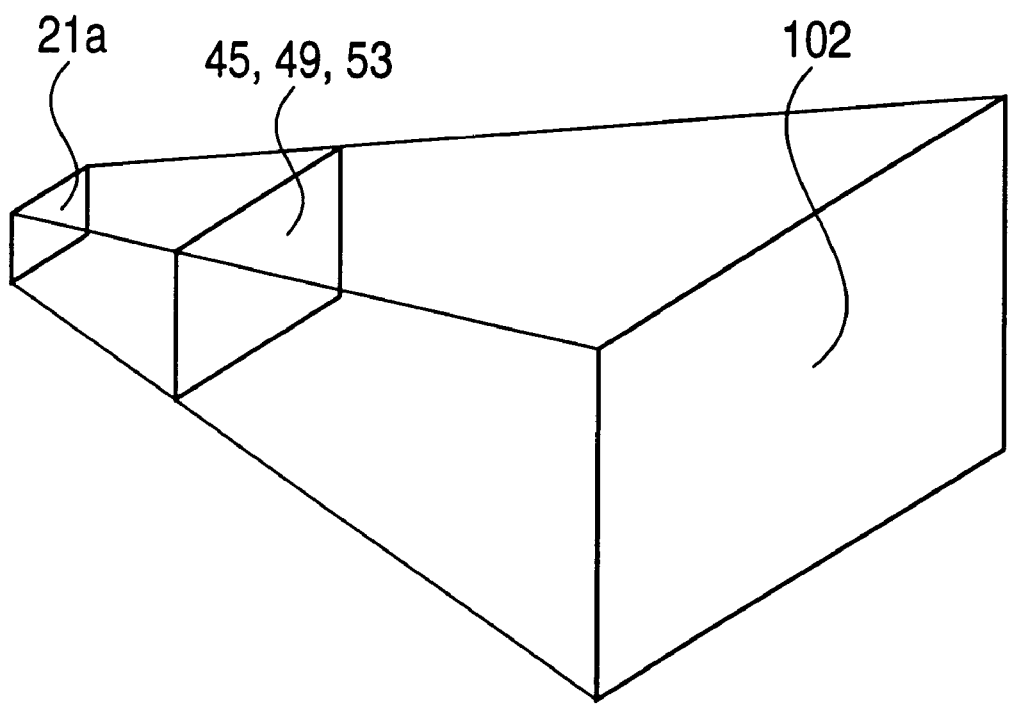
FIG. 19 shows an example in which each cell lens of the first optical block, liquid crystal display panels, and a screen have the same aspect ratio.

The aspect ratio (the horizontal length vs. the vertical length) of each of the cell lenses 21a–21d (see FIG. 18A) is set at, for example, 16:9, which is approximately equal to the aspect ratio of the liquid crystal display panels 45, 49, and 53 as the light modulation devices (see FIG. 15) and the aspect ratio of the screen 102 (see FIG. 15) as shown in FIG. 19.

Preferably by forming each of the cell lenses 21a–21d and 23a–23d so that it is composed of at least two kinds of aspherical surfaces (see FIGS. 20A and 20B) and, even preferably, by forming the cell lenses 21a–21d and 23a–23d so that the cell lenses of each set have different aspherical surface shapes, the aberrations relating to the imaging positions of beams can be controlled freely as illustrated in FIGS. 16 and 17, whereby a uniform imaging state can be obtained.

The second optical block 2 has a first converging component 23f in addition to the second lens array 23. The first converging component 23f has a convex surface shape and is integral with the second lens array 23. The condenser lenses 43, 47, and 51 as the second converging component are disposed between the second optical block 2 and the respective liquid crystal panels 45, 49, and 53.

FIGS. 16 and 17 exemplify how a uniform imaging state is obtained by the optical functions of the first optical block 1 and the second optical block 2 as described above.

FIG. 16 shows that proper and uniform imaging is attained at the entrance pupil E of the projection lens 13 mainly because each of the cell lenses 21a–21d of the first lens array 21 of the first optical block 1 is composed of at least two kinds of aspherical surfaces and, even preferably, because the cell lenses 21a–21d have different aspherical surface shapes.

FIG. 17 shows that an imaging position FP is placed on the liquid crystal display panel 49 because each of the cell lenses 23a–23d of the second lens array 23 of the second optical block 2 is composed of at least two kinds of aspherical surfaces and the cell lenses 23a–23d have different aspherical surface shapes.

FIGS. 16 and 17 are directed to the case of a green beam G, where the optical system includes the first optical block 1, the second lens block 2, the condenser lens 47, the liquid crystal display panel 49, and the dichroic prism 41.

Imaging characteristics etc. of the first optical block 1 and the second optical block 2 that will be describe below are attained in similar manners for a green beam G, a red beam R, and a blue beam B. Functions that are characteristic of the first optical block 1 and the second optical block 2 will be described below for a representative case of a green beam G with reference to FIGS. 16 and 17.

As shown in FIG. 16, mainly by optimizing the aspherical surface shapes of the respective cell lenses 21a–21d of the first optical block 1 so as to cancel out aberrations occurring in the optical system downstream of the first optical block 1 mainly owing to the condenser lens 47 as the second converging component, images formed in the vicinity of the second lens array 2 by the first lens array 1 can be re-imaged on the entrance pupil E of the projection lens 13 as indicated by solid lines and broken lines in FIG. 16.

As a result, an imaging state having a higher degree of uniformity can be obtained on the entrance pupil E of the projection lens 13, whereby illumination light that is uniform, highly efficient, and free of loss and unevenness in light quantity.

A function obtained mainly by the cell lenses 23a–23d of the second optical block 2 will be described below with reference to FIG. 17. Beams L pass through the cell lenses 21a–21d of the first optical block 1 and the cell lenses 23a–23d of the second optical block 2 and are then converged by the first converging component 23f, whereby the beams L are imaged on the liquid crystal panel 49 after passing through the condenser lens 47.

In this manner, mainly by optimizing the aspherical surface shapes of the respective cell lenses 23a–23d of the second optical block 2 so as to cancel out the spherical aberration of the first converging component 23f, the beams L can be imaged properly and uniformly on the liquid crystal display panel 49 unlike the conventional case.

As described above, in contrast to the conventional case in which the first lens array 21 and the second lens array 23 are each constituted of cell lenses having the same spherical surface, by using the aspherical cell lenses 23a–23d of the second lens array 23 in the embodiment of FIG. 17, the aberrations caused by the composite converging component of the first converging component 23f and the condenser lens 47 can be corrected properly. Therefore, the imaging positions FP corresponding to the respective cell lenses 23a–23d of the second lens array 2 can be arranged uniformly on the liquid crystal display panel 49.

As a result, an imaging state having a higher degree of uniformity can be obtained in the vicinity of the liquid crystal display panel 49, whereby illumination light that is uniform, highly efficient, and free of loss and unevenness in light quantity.

It is noted that each of the cell lenses 23a–23d of the second lens array 23 is composed of at least two kinds of aspherical surfaces and the cell lenses 23a–23d have different aspherical surface shapes depending on their positions.

In FIGS. 16 and 17, each of the cell lenses 21a–21d of the first optical block 1 and each of the cell lenses 23a–23d of the second optical block 2 are composed of at least two kinds of aspherical surfaces and, even preferably, adjacent ones of the cell lenses 21a–21d and adjacent ones of the cell lenses 23a–23d have different aspherical surface shapes.

However, the invention is not limited to such a case. For example, only the first optical block 1 may employ the concept of the above embodiment (cell lenses 21a–21d) or only the second optical block 2 may employ it (cell lenses 23a–23d). The embodiment of FIGS. 16 and 17 shows the best mode in which the best first optical block 1 and the best second optical block 2 are combined.

Although FIGS. 16 and 17 are directed to the case of a green beam G, the same thing applies to a red beam R and a blue beam B. The above-described functions can be attained for all the primary colors (R, G, and B).

Figure 21:
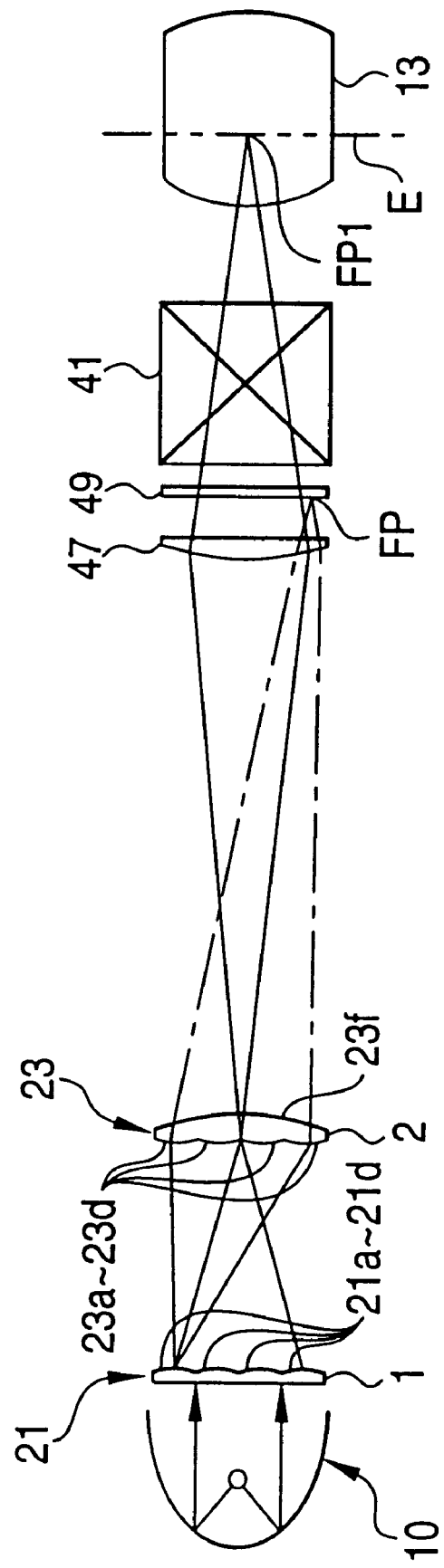
FIG. 21 shows an example of a light beam formed by the first and second optical blocks and a manner of formation its image.

FIG. 21 is a simplified optical path diagram as a combination of the diagrams of FIGS. 16 and 17. As already described above, the cell lenses 21a–21d of the first optical block 1 mainly operate to form images on the entrance pupil E of the projection lens 13 and the cell lenses 23a–23d of the second optical block 2 mainly operate to form images on the liquid crystal display panel 49.

Next, other embodiments of the invention will be described with reference to FIGS. 22–27.

Figure 22:
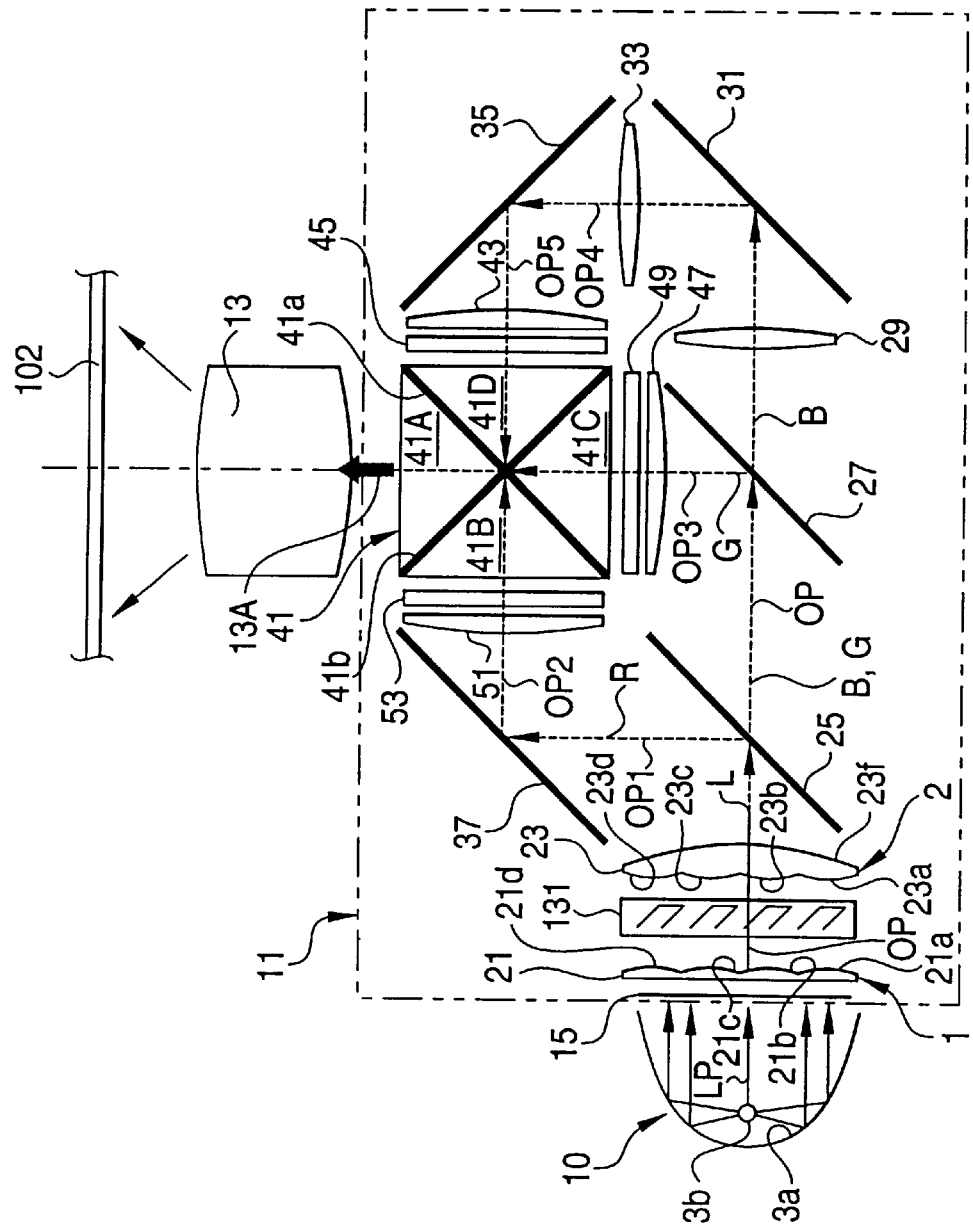
FIG. 22 shows another embodiment of the invention.

As shown in FIG. 22, a polarization conversion element 131 is disposed between the first optical block 1 and the second optical block 2 of the optical device 11 according to the embodiment of FIG. 15. For example, the polarization conversion block 131 converts a light beam (P+S waves) that is obtained as a result of passage through the filter 15 and the first optical block 1 of a light beam LP emitted from the light source 10 into only a P wave, which is applied to the second optical block 2.

This configuration makes it possible to apply a light beam emitted from the light source 10 to the liquid crystal panels 45, 49, and 53 as light bulbs more efficiently with an even higher degree of uniformity. The polarization conversion element 131 separates, from a light beam LP emitted from the ordinary light source 10, a beam having only one of the two kinds of polarization planes of the light beam LP. In general, polarized light can be separated into a P-polarization component (P wave) and an S-polarization component (S wave). In this type of display apparatus, a light beam emitted from the light source is converted, before entering the liquid crystal display panels, with the polarization conversion element 131, into a light beam having only one polarization plane (P wave or S wave) depending on the type of the polarizing plates provided in front of the respective liquid crystal display panels.

For example, the polarization conversion element 131 as a means for obtaining a P wave or an S wave is formed by polarizing beam splitters (hereinafter abbreviated as PBSs). When randomly polarized light (P+S waves) is input, at a predetermined angle, to a PBS that is, for example, incorporated in prisms, the PBS, for example, transmits the P wave and reflects the S wave. In one method, the S wave is reflected by an end face of the prisms so as to be returned to a parallel beam and only the S wave is caused to pass through a (½)λ plate to convert it to a P wave.

By using the above type of polarization conversion element, a light component that is absorbed by polarizing plates conventionally can be utilized effectively. A light beam emitted from the light source can be applied to the liquid crystal display panels efficiently with a high degree of uniformity.

Figure 23A:
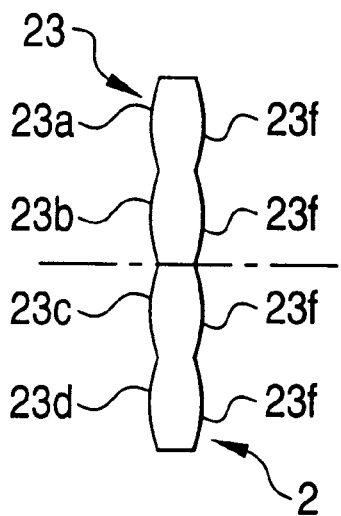
FIGS. 23A–23C show other embodiments of the invention.
Figure 23B:
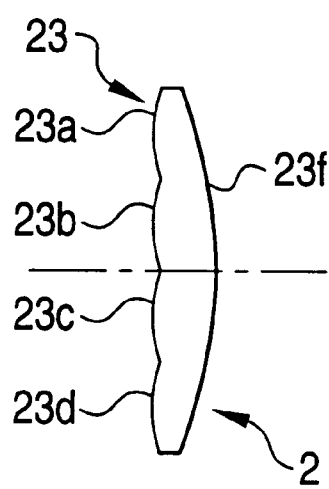
Figure 23C:
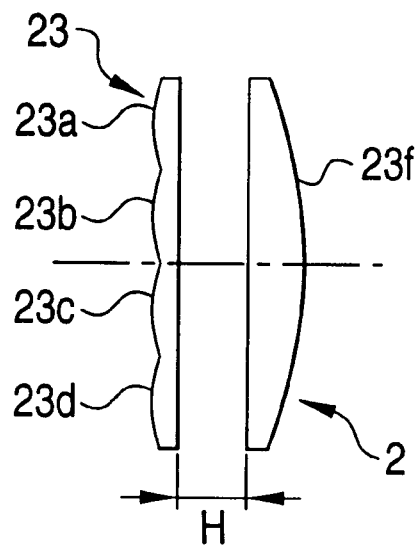

Next, reference is made to FIGS. 23A–23C. In a second optical block 2 shown in FIG. 23A, cell lenses 23a–23d of a second lens array 23 is formed on the light source 10 side (see FIG. 15). The cell lenses 23a–23d of FIG. 23A are integrated with first converging components 23f, respectively.

In a second optical block 2 shown in FIG. 23B, cell lenses 23a–23d of a second lens array 23 are integral with a single, large first converging component 23f. The cell lenses 23a–23d are opposed to the first optical block 1.

FIG. 23C shows a second optical block 2 according to still another embodiment of the invention. An air gap H is provided between a second lens array 23 of the second optical block 2 and a first converging component 23f.

Figure 24:
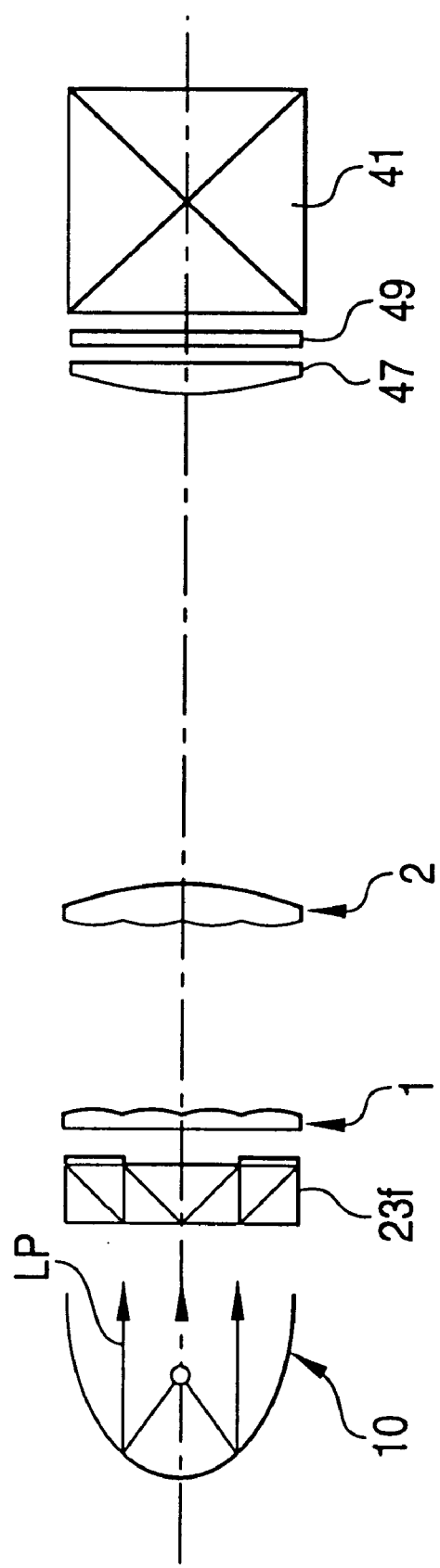
FIG. 24 shows another embodiment of the invention.

FIG. 24 shows an example optical system including a light source 10, a polarization conversion element 231, a first optical block 1, a second optical block 2, a condenser lens (second converging component) 47, a liquid crystal display panel 49, and a dichroic prism 41. In this example, the polarization conversion element 231 is disposed between the light source 10 and the first optical block 1. Having the same function as the polarization conversion element 131 shown in FIG. 22, the polarization conversion element 231 can convert a light beam LP into only a P wave or an S wave and supply it to the first optical block 1.

Figure 25:
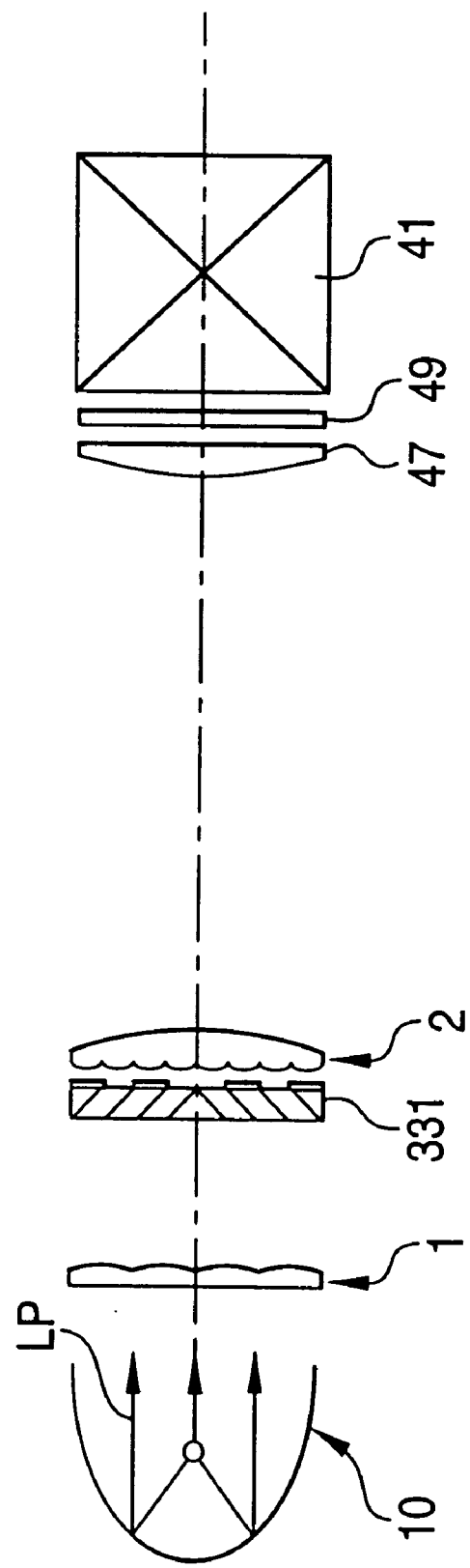
FIG. 25 shows still another embodiment of the invention.
Figure 26:
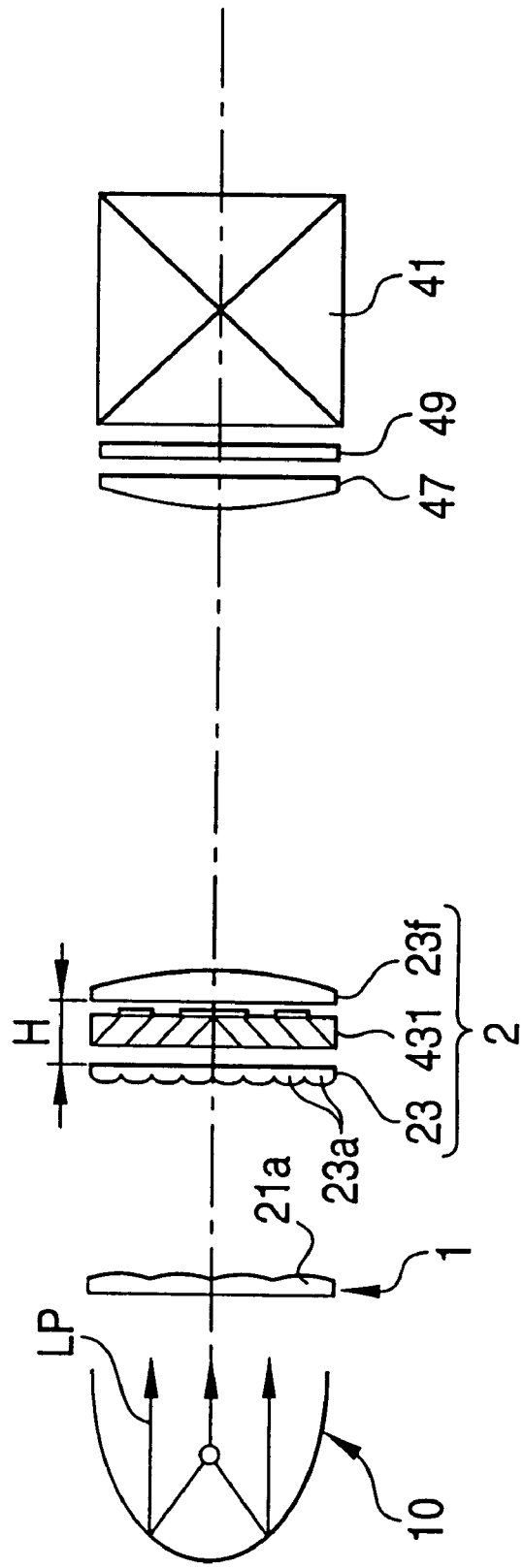
FIG. 26 shows a further embodiment of the invention.

In an embodiment of FIG. 25, a polarization conversion element 331 is disposed between a first optical block 1 and a second optical block 2. In an embodiment of FIG. 26, an air gap H is provided between a second lens array 23 and a first converging component 23f of a second optical block 2. A polarization conversion element 431 is disposed in the air gap H.

Figure 27A:
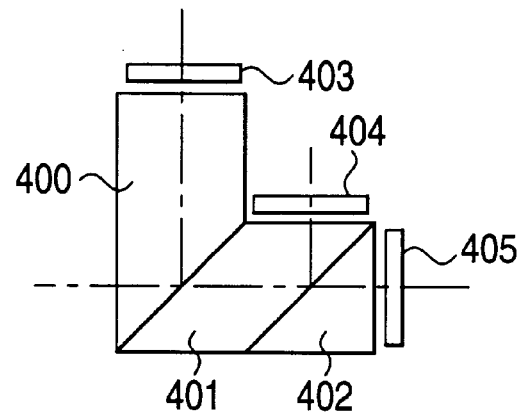
FIGS. 27A–27C show other embodiments of the invention.
Figure 27B:
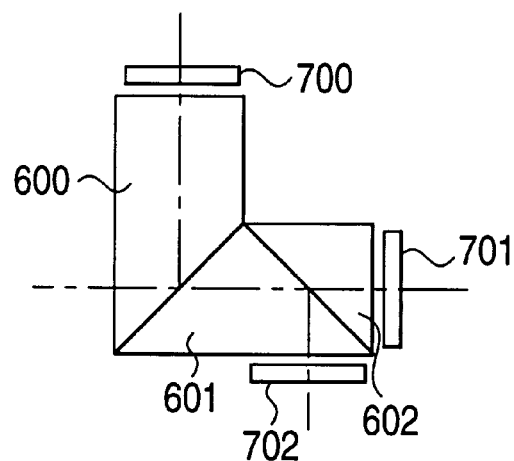
Figure 27C:
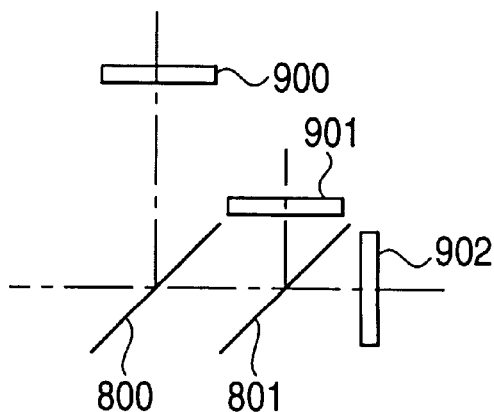

FIGS. 27A–27C show examples of light composing means that can be used instead of, for example, the dichroic prism 41 as the light composing element shown in FIG. 15. FIG. 27A shows what is called an L-shaped light composing means that is a combination of prisms 400–402. Light modulation devices or liquid crystal display panels 403–405 are disposed so as to be opposed to the respective prisms 400–402.

Similarly, the light composing means of FIG. 27B is composed of prisms 600–602. Three liquid crystal display panels 700–702 are disposed so as to be opposed to the respective prisms 600–602. The light composing means of FIG. 27C is composed of two dichroic mirrors 800 and 801. Three liquid crystal display panels 900–902 are disposed adjacent to the dichroic mirrors 800 and 801.

As other embodiments of the invention, the light composing means of FIGS. 27A–27C can be used instead of, for example, the dichroic prism 41 shown in FIG. 15.

Figure 28:
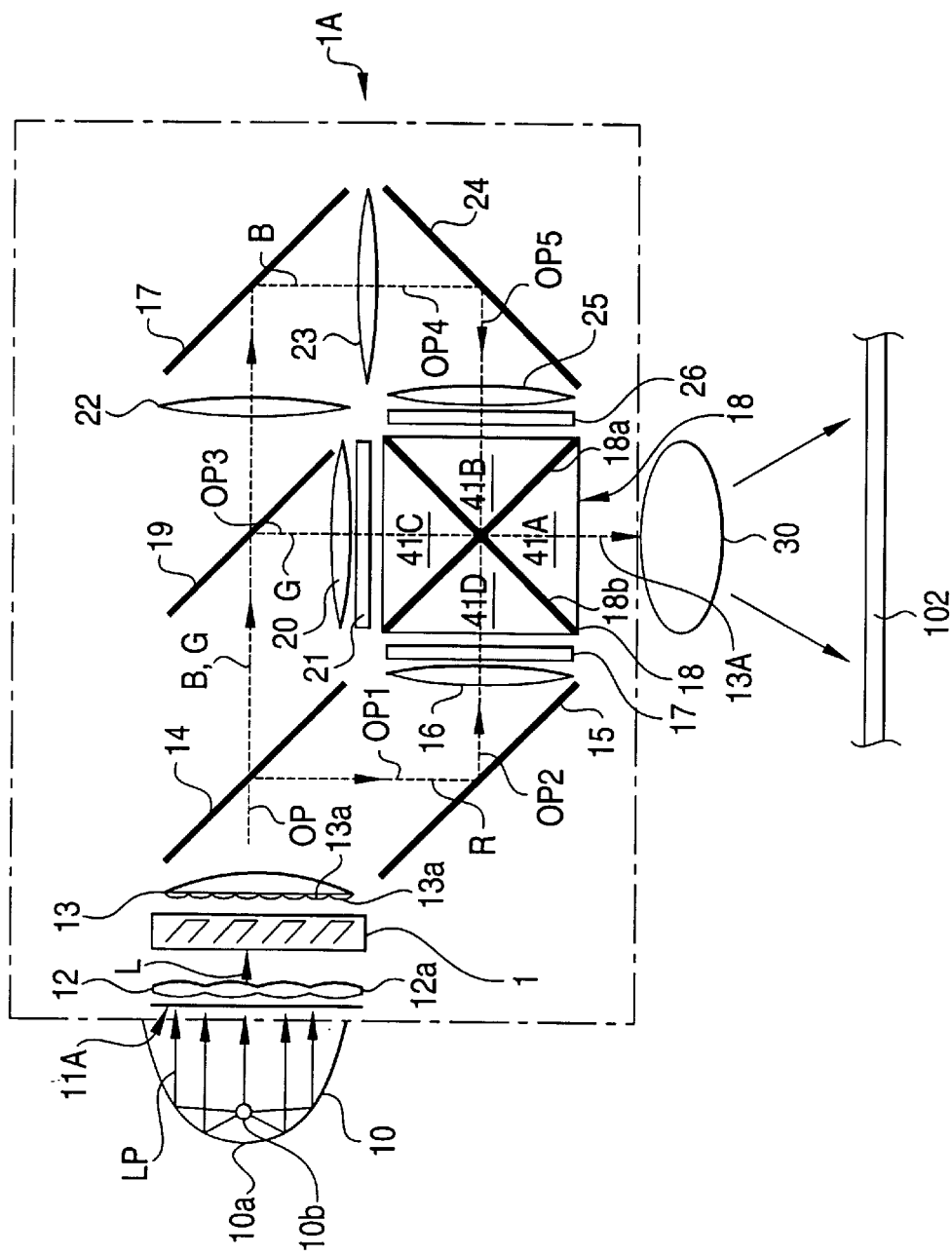
FIG. 28 shows another internal structure of the optical apparatus shown in FIG. 14.
Figure 29:
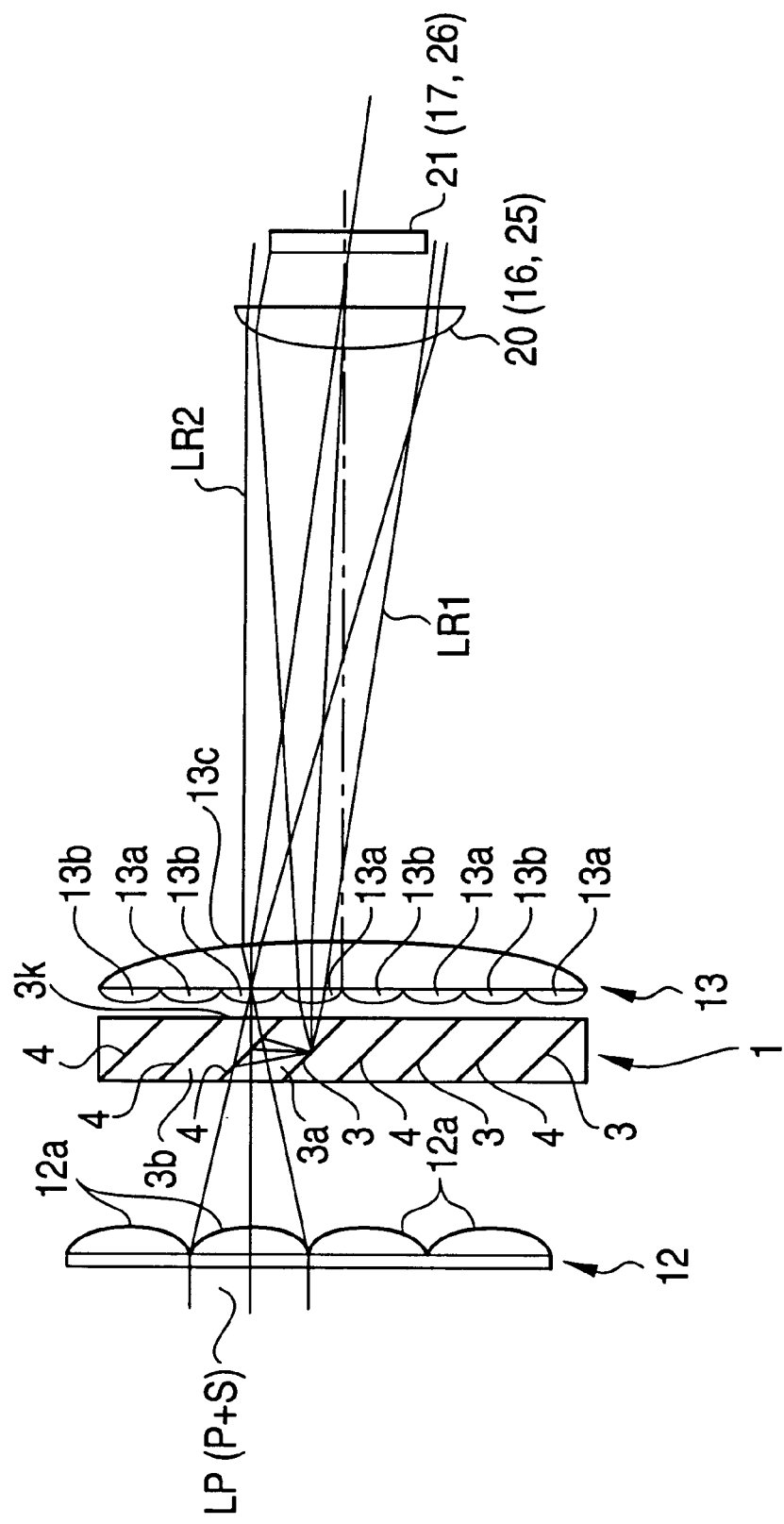
FIG. 29 shows a first lens array, an optical block, a second lens array, and other elements of the optical apparatus of FIG. 28.

Next, a first lens array 12, an optical block 1, and a second lens array 13 shown in FIG. 28 will be described in detail. FIG. 29 shows the first lens array 12, the optical block 1, and the second lens array 13 as well as a condenser lens 20 and a liquid crystal display panel 21 that are shown representatively.

The first lens array 12 is a multi-lens array in which a plurality of convex lens 12a are arranged in matrix form. The second lens array 13 is a multi-lens array in which different convex lenses 13a and 13b are arranged alternately. The convex lenses 13a and 13b of the second lens array 13 are integral with a convex lens 13c. Each convex lens 12a of the first lens array 12 has approximately the same size as a combination of a first prism 3a and a second prism 3b of the optical block 1 that are adjacent to the convex lens 12a. On the other hand, the convex lenses 13a and 13b of the second lens array 13 correspond to the first prism 3a and the second prism 3b, respectively, and are hence smaller than the convex lens 12a.

The optical block 1 is disposed in an air gap between the first lens array 12 and the second lens array 13.

The structure of the optical block 1 will be described below with reference to FIGS. 30 and 31.

Figure 30:
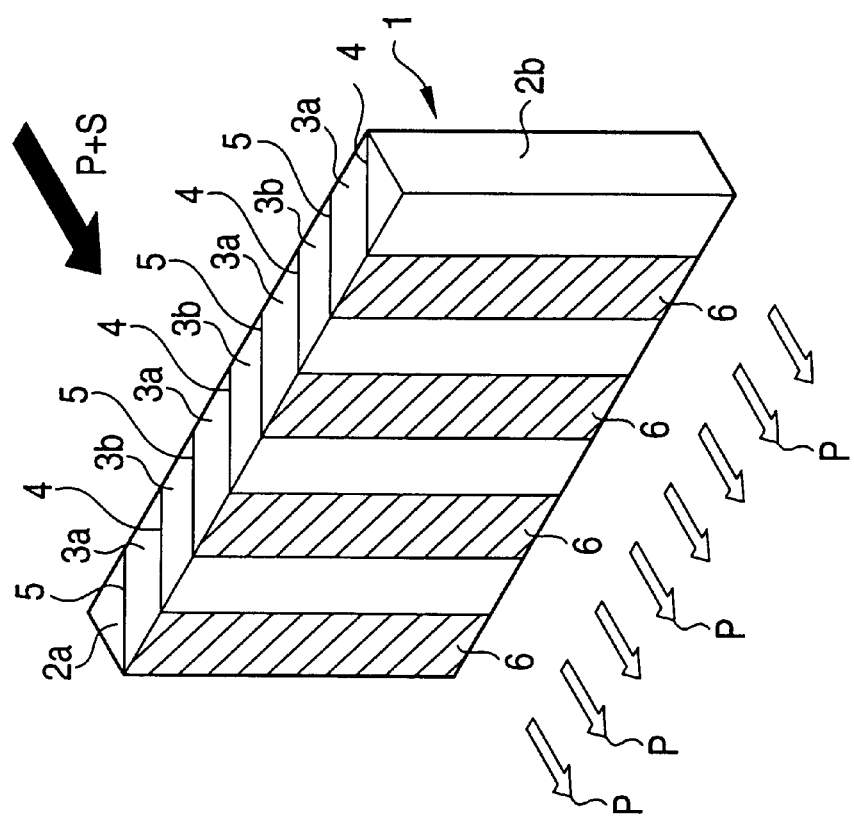
FIG. 30 is a perspective view of an example of the optical block shown in FIG. 29.
Figure 31:
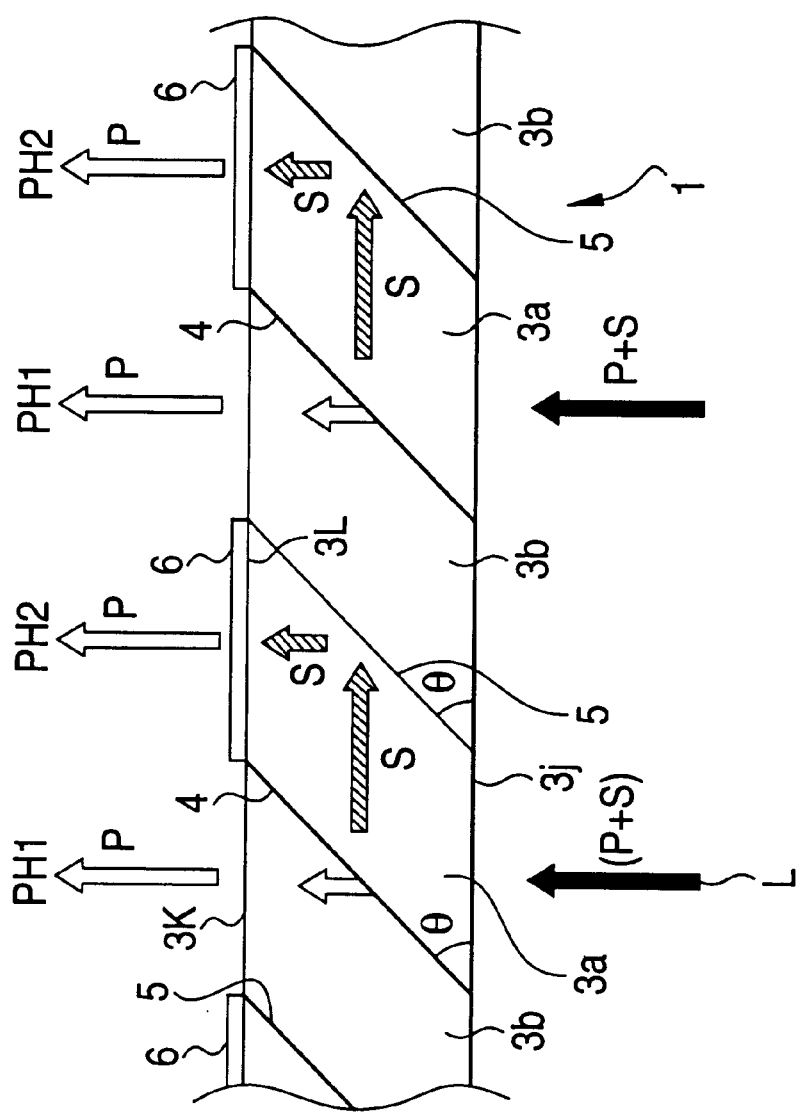
FIG. 31 is a plan view of part of the optical block of FIG. 30.

As shown in FIG. 30, the optical block 1 is configured so as to assume a plate-like shape in which the first prism 3a and the second prism 3b are arranged alternately and triangular prisms 2a and 2b are disposed at both ends. The first prism 3a and the second prism 3b have a parallelogrammic cross-section and the prisms 2a and 2b have a triangular cross-section. The first prism 3a and the second prism 3b are arranged alternately and bonded to each other with an adhesive.

The first prism 3a has a polarizing beam splitter (PBS) 4 as a polarization component transmission/reflection member and a mirror 5 as a polarization component reflection member. The polarizing beam splitter 4 and the mirror 5 are formed so as to be opposed to the respective slope surfaces of the prism 3a. The polarizing beam splitter 4 and the mirror 5 are formed so as to be inclined from the major surfaces of the optical block 1 by an angle θ. As shown in FIG. 31, a light beam L (P+S waves) incident on an incidence surface 3j of the prism 3a reaches the polarizing beam splitter 4. Only a P wave of the light beam L travels along an optical path PH1, that is, passes through the adjacent second prism 3b. Only the P wave is output from an exit surface 3k of the second prism 3b along the optical path PH1.

On the other hand, an S wave of the light beam L is reflected by the polarizing beam splitter 4 (the traveling direction is changed by 90°) toward the mirror 5. The S wave is again reflected by the mirror 5 (the traveling direction is changed by 90°). The reflected S wave passes through a (½)λ plate 6 that is formed on an exit surface 3L of the first prism 3a, whereby the S wave is converted to a P wave. The (½)λ plate 6 is a polarization conversion member. The resulting P wave is output along an optical path PH2, that is, parallel with the optical path PH1.

Referring to FIG. 29, a P wave that has passed through the polarizing beam splitter 4 and has been output from the exit surface 3k of the second prism 3b goes along the optical path PH1 and directly enters the corresponding convex lens 13b of the second lens array 13.

On the other hand, an S wave that has been reflected once by the polarizing beam splitter 4 (see FIG. 31) is again reflected by the mirror 5 and converted to a P wave by the (½)λ plate 6. The resulting P wave goes along the optical path PH2 and enters the corresponding convex lens 13a of the second lens array 13 (see FIG. 29).

Beams LR1 and LR2 that have passed through the respective convex lenses 13a and 13b of the second lens array 13 pass through the convex lens 13c of the second lens array 13 and the condenser lens 20 (16, 25) are superimposed on each other to form, with only small loss in light quantity, uniform illumination light for the liquid crystal display panel 21 (17, 26).

One important feature of the invention is that the focal length of the lenses 13a of the second lens array 13 is different from that of the lenses 13b of the second lens array 13.

Changing the focal lengths of the adjacent lenses 13a and 13b provides the following merits. As shown in FIG. 31, a P wave that has passed through the first prism 3a, the polarizing beam splitter 4, and the second prism 3b and goes along the optical path PH1 and a P wave that goes along the optical path PH2 and has been obtained in such a manner that an S wave reflected by the polarizing beam splitter 4 and the mirror 5 is converted into a P wave by the (½)λ plate 6 have different optical path lengths. By changing the focal lengths of the adjacent lenses 13a and 13b, illumination beams passing through the respective lenses 13a and 13b can be focused on the liquid crystal display panel 21 (17, 26) as the light modulation device. Therefore, approximately uniform focusing is attained on the liquid crystal display panel 21.

In this manner, deviations of image points with respect to the liquid crystal display panel 21 (17, 26), that is, the defocusing phenomenon, are prevented and hence the reduction in the quantity of light passing through the liquid crystal display panel 21 (17, 26) is prevented, which in turn increases the utilization efficiency of light emitted from the light source. By using the first and second lens arrays 12 and 13 and the optical block 1, a light beam that has been emitted from the light source 10 and passed through the UV/IR-cutting filter 11A can be polarized into a P wave and the P wave can be applied to the effective apertures of the liquid crystal display panels 17, 21, and 26 efficiently and uniformly.

It is preferable that each of the lenses 12a, 13a, and 13b of the first lens array 12 and the second lens array 13 be approximately similar (equal in aspect ratio) to the aspect ratio of the effective apertures of the liquid crystal display panels 17, 21, and 26 as the light modulation devices (light spatial modulation devices).

The second lens array 13 that is disposed downstream of the optical block 1 is configured in such a manner that the convex lenses 13a and 13b are formed on the surface opposed to the optical block 1 (incidence side) and the single convex lens 13c as the condenser lens is formed on the liquid crystal display panel side (exit side).

Each of the convex lenses 13b of the second lens array 13 is disposed on the optical path PH1 of a beam that passes through the corresponding convex lens 12a of the first lens array 12 and the polarizing beam splitter 4 of the optical block 1. Each of the convex lenses 13a of the second lens array 13 is disposed on the optical path PH2 of a beam that passes through the corresponding convex lens 12a of the first lens array 12, is reflected by the polarizing beam splitter 4 and the mirror 5, and then passes through the (½)λ plate 6.

Polarizing plates (not shown) for extracting a light component having one polarization direction from input light are disposed upstream of the respective liquid crystal display panels 17, 21, and 26 and polarizing plates (not shown) for transmitting only a light component having a predetermined polarization plane of exit light are disposed downstream of the respective liquid crystal display panels 17, 21, and 26. The intensity of incident light is modulated in accordance with the voltage of a circuit that drives each liquid crystal.

Although the above embodiment is directed to the three-panel liquid crystal projector apparatus, the invention can also be applied to a single-panel liquid crystal projector apparatus, a 3D (three-dimensional) liquid crystal projector apparatus, a laser light polarization high-efficiency exchange optical system, etc.

In an optical device for a display apparatus in which an optical block can be so formed that its incidence portion and exit portion have the same size as the opening of a light source and hence the optical block can be made thin to enable space saving and weight reduction, the above embodiment makes it possible to apply light more efficiently to a display device such as a liquid crystal display panel.

The invention is not limited to the above-described embodiments.

Although the above embodiments are directed to the rear projection display apparatus of the three panel type (three liquid crystal display panels are used), the invention is not limited such a case and can also be applied to a single-panel projection display apparatus (only one liquid crystal display panel is used).

The light bulb or the light modulation device is not limited to a liquid crystal display panel and may be other kinds of display panel.

The invention is not limited to the rear projection display apparatus in which composed light is projected onto the screen from its back side as shown in FIG. 12, and can also be applied to, for example, a front projector in which composed light is directly projected onto the front surface of the screen.

In the display apparatus according to one embodiment of the invention, first and second lens arrays and an optical block as a combination of polarizing beam splitters, mirrors, and (½)λ plates are used and the light utilization efficiency is increased by optimizing the focal lengths of two kinds of lenses of the second lens array that correspond to respective beams that are separated by the polarizing beam splitter and go along optical paths PH1 and PH2.

What is claimed is:

1. A display apparatus comprising:
   a light source adapted to emit a light beam,
   an illumination optical device adapted to act upon the emitted light beam;
   a light modulation device to which the light beam emitted from the light source is applied via the illumination optical device, the light modulation device modulating the applied light beam; and
   a projection lens for projecting the modulated light beam,
   the illumination optical device comprising:
      a first optical block including a first lens array having a plurality of cell lenses each being substantially similar in shape to the light modulation device but having substantially different aspherical surfaces in order to correct for spherical and chromatic aberrations;
      a second optical block including a second lens array having a plurality of cell lenses corresponding to respective cell lenses of the first lens array of the first optical block, and a first converging component for converging beams that have passed through the second lens array toward the light modulation device; and
      a second converging component disposed in the vicinity of the light modulation device, for imaging beams that are output from the second optical block at a predetermined position.

2. The display apparatus according to claim 1, wherein each of the cell lenses of the first lens array of the first optical block is composed of at least two kinds of different aspherical surfaces designed to correct for spherical and chromatic aberrations.

3. The display apparatus according to claim 1, wherein each of the cell lenses of the second lens array of the second optical block is composed of at least two kinds of different aspherical surfaces designed to correct for spherical and chromatic aberrations.

4. The display apparatus according to claim 1, wherein in the second optical block the first converging component is formed integral with the second lens array.

5. The display apparatus according to claim 1, wherein in the second optical block the first converging component is formed integral with each of the cell lenses of the second lens array.

6. The display apparatus according to claim 1, wherein in the second optical block the second lens array and the first converging component are spaced from each other.

7. The display apparatus according to claim 1, wherein the illumination optical device further comprises a polarization conversion element between the light source and the first optical block.

8. The display apparatus according to claim 1, wherein the illumination optical device further comprises a polarization conversion element between the first optical block and the second optical block.

9. A display apparatus comprising:
   a light source adapted to emit a light beam;
   an illumination optical device adapted to act upon the emitted light beam;
   a light modulation device to which the light beam emitted from the light source is applied via the illumination optical device, the light modulation device modulating the applied light beam; and
   a projection lens for projecting the modulated light beam,
   the illumination optical device comprising:
      a first optical block including a first lens array having a plurality of cell lenses each being substantially similar in shape to the light modulation device;
      a second optical block including a second lens array having a plurality of cell lenses corresponding to respective cell lenses of the first lens array of the first optical block, and a first converging component for converging beams that have passed through the second lens array toward the light modulation device, the cell lenses of the second optical block having substantially different aspherical surfaces in order to correct for spherical and chromatic aberrations; and
      a second converging component disposed in the vicinity of the light modulation device, for imaging beams that are output from the second optical block at a predetermined position.

10. The display apparatus according to claim 9, wherein each of the cell lenses of the second lens array of the second optical block is composed of at least two kinds of different aspherical surfaces designed to correct for spherical and chromatic aberrations.

11. The display apparatus according to claim 9, wherein each of the cell lenses of the first lens array of the first optical block is composed of at least two kinds of different aspherical surfaces designed to correct for spherical and chromatic aberrations.

12. The display apparatus according to claim 9, wherein in the second optical block the first converging component is formed integral with the second lens array.

13. The display apparatus according to claim 9, wherein in the second optical block the first converging component is formed integral with each of the cell lenses of the second lens array.

14. The display apparatus according to claim 9, wherein in the second optical block the second lens array and the first converging component are spaced from each other.

15. The display apparatus according to claim 9, wherein the illumination optical device further comprises a polarization conversion element between the light source and the first optical block.

16. The display apparatus according to claim 9, wherein the illumination optical device further comprises a polarization conversion element between the first optical block and the second optical block.

17. An optical block of an optical device, comprising:
   a polarization component transmission/reflection member for transmitting a first polarization component of light and reflecting a second polarization component of light;
   a polarization component reflection member for reflecting the second polarization component that has been reflected by the polarization component transmission/reflection member;
   a polarization component conversion member for converting the second polarization component that has been reflected by the polarization component reflection member into a polarization component having a polarization direction similar to that of said first polarization component;

a plurality of first prisms for causing the polarization component conversion member to output the converted second polarization component; and a plurality of second prisms disposed adjacent to the respective first prisms, for outputting the first polarization component;

a first lens array disposed at a light incident side of the optical block and being formed of a collection of a plurality of lenses each corresponding to one of the plurality of first prisms; and a second lens array disposed at a light exit side of the optical block and being formed of a collection of a plurality of lenses each corresponding to one of the plurality of second prisms, the lenses of the second lens array that correspond to the first prisms having a different focal length than the lenses of the second lens array that correspond to the second prisms.

18. The optical device according to claim 17, wherein in the optical block the first prisms and the second prisms are arranged alternately with the polarization component transmission/reflection member and the polarization component reflection member interposed between each pair of first prisms and each pair of second prisms.

19. The optical device according to claim 17, wherein in the optical block the polarization component transmission/reflection member is a polarization beam splitter and the polarization component reflection member is a mirror surface.

20. A display apparatus comprising:

a light source adapted to emit a light beam;

an optical device adapted to act upon the emitted light beam;

a light modulation device to which the light beam emitted from the light source is applied via the optical device, the light modulation device modulating the applied light beam; and a projection lens for projecting the light beam modulated by the light modulation device, an optical block of the illumination optical device comprising:

a polarization component transmission/reflection member for transmitting a first polarization component of light and reflecting a second polarization component of light;

a polarization component reflection member for reflecting the second polarization component that has been reflected by the polarization component transmission/reflection member;

a polarization component conversion member for converting the second polarization component that has been reflected by the polarization component reflection member into a polarization component having a polarization direction similar to that of said first polarization component;

a plurality of first prisms for causing the polarization component conversion member to output the converted second polarization component; and a plurality of second prisms disposed adjacent to the respective first prisms, for outputting the first polarization component;

a first lens array disposed of a light incident side of the optical block and being formed of a collection of a plurality of lenses each corresponding to one of the plurality of first prisms; and a second lens array disposed at a light exit side of the optical block and being formed of a collection of a plurality of lenses each corresponding to one of the plurality of second prisms, the lenses of the second lens array that correspond to the first prisms having a different focal length than the lenses of the second lens array that correspond to the second prisms.

21. The display apparatus according to claim 20, wherein in the optical block the polarization component transmission/reflection member is a polarizing beam splitter and the polarization component reflection member is a mirror surface.

* * * * *